United States Patent
Srinivasan et al.

(10) Patent No.: US 11,004,454 B1
(45) Date of Patent: May 11, 2021

(54) VOICE PROFILE UPDATING

(71) Applicant: Amazon Technologies, Inc., Seattle, WA (US)

(72) Inventors: Sundararajan Srinivasan, Sunnyvale, CA (US); Arindam Mandal, Redwood City, CA (US); Krishna Subramanian, Cupertino, CA (US); Spyridon Matsoukas, Hopkinton, MD (US); Aparna Khare, San Jose, CA (US); Rohit Prasad, Lexington, MA (US)

(73) Assignee: Amazon Technologies, Inc., Seattle, WA (US)

( * ) Notice: Subject to any disclaimer, the term of this patent is extended or adjusted under 35 U.S.C. 154(b) by 116 days.

(21) Appl. No.: 16/182,021

(22) Filed: Nov. 6, 2018

(51) Int. Cl.
*G10L 17/04* (2013.01)
*G06F 3/16* (2006.01)
*G10L 17/00* (2013.01)
*G10L 15/06* (2013.01)

(52) U.S. Cl.
CPC ............. *G10L 17/04* (2013.01); *G06F 3/16* (2013.01); *G10L 15/06* (2013.01); *G10L 17/00* (2013.01)

(58) Field of Classification Search
CPC .............................. G10L 17/04; G10L 15/06
See application file for complete search history.

(56) References Cited

U.S. PATENT DOCUMENTS

| | | | |
|---|---|---|---|
| 6,789,062 B1 * | 9/2004 | Phillips | G10L 15/063 704/231 |
| 9,685,161 B2 * | 6/2017 | Lu | G10L 15/07 |
| 2003/0036903 A1 * | 2/2003 | Konopka | G10L 15/065 704/249 |
| 2005/0187770 A1 * | 8/2005 | Kompe | G10L 15/065 704/250 |
| 2007/0225984 A1 * | 9/2007 | Milstein | G10L 25/48 704/270 |
| 2010/0106501 A1 * | 4/2010 | Miki | G10L 17/04 704/243 |
| 2012/0010887 A1 * | 1/2012 | Boregowda | G10L 15/22 704/250 |
| 2013/0325474 A1 * | 12/2013 | Levien | G10L 15/065 704/251 |

(Continued)

OTHER PUBLICATIONS

C. Barras, et al., "Unsupervised Online Adaptation for Speaker Verification Over the Telephone." The Speaker and Language Recognition Workshop (http://www.isca-speech.org/archive) (2004).

(Continued)

*Primary Examiner* — Douglas Godbold
(74) *Attorney, Agent, or Firm* — Pierce Atwood LLP

(57) ABSTRACT

Techniques for updating voice profiles used to perform user recognition are described. A system may use clustering techniques to update voice profiles. When the system receives audio data representing a spoken user input, the system may store the audio data. Periodically, the system may recall, from storage, audio data (representing previous user inputs). The system may identify clusters of the audio data, with each cluster including similar or identical speech characteristics. The system may determine a cluster is substantially similar to an existing voice profile. If this occurs, the system may create an updated voice profile using the original voice profile and the cluster of audio data.

20 Claims, 15 Drawing Sheets

(56) References Cited

U.S. PATENT DOCUMENTS

| | | | | |
|---|---|---|---|---|
| 2014/0278420 | A1* | 9/2014 | Meloney | G10L 15/063 704/249 |
| 2015/0019220 | A1* | 1/2015 | Talhami | G10L 15/063 704/244 |
| 2015/0348540 | A1* | 12/2015 | Ljolje | G10L 15/01 704/235 |
| 2016/0372116 | A1* | 12/2016 | Summerfield | G10L 25/63 |
| 2017/0076727 | A1* | 3/2017 | Ding | G10L 17/04 |
| 2018/0233140 | A1* | 8/2018 | Koishida | G06F 3/017 |
| 2018/0254034 | A1* | 9/2018 | Li | G10L 13/02 |
| 2018/0286401 | A1* | 10/2018 | Oh | G10L 15/063 |
| 2018/0301144 | A1* | 10/2018 | Park | G10L 15/06 |
| 2018/0308471 | A1* | 10/2018 | Kapralova | G10L 15/063 |
| 2018/0366125 | A1* | 12/2018 | Liu | G10L 15/08 |
| 2019/0103117 | A1* | 4/2019 | Kondoh | G06F 21/32 |
| 2019/0156832 | A1* | 5/2019 | Church | G10L 25/51 |
| 2019/0348023 | A1* | 11/2019 | Kwon | G10L 15/005 |
| 2019/0362709 | A1* | 11/2019 | Agrawal | G10L 15/22 |
| 2019/0371296 | A1* | 12/2019 | Iwase | G06F 3/16 |
| 2020/0051548 | A1* | 2/2020 | Chen | G10L 15/063 |
| 2020/0066281 | A1* | 2/2020 | Grancharov | G10L 17/06 |
| 2020/0098356 | A1* | 3/2020 | Kim | G10L 15/20 |

OTHER PUBLICATIONS

Shou-Chun Yin, et al., "A Joint Factor Analysis Approach to Progressive Model Adaptation in Text-Independent Speaker Verification," IEEE Transactions on Audio, Speech, and Language Processing, vol. 15, No. 7, pp. 1999-2010, 2007.

E. Hansen, et al., "Supervised and Unsupervised Speaker Adaptation in the NIST 2005 Speaker Recognition Evaluation," 2006 IEEE Odyssey—The Speaker and Language Recognition Workshop. IEEE, 2006, pp. 1-8.

S. Shum, et al., "Limited Labels for Unlimited Data: Active Learning for Speaker Recognition," Fifteenth Annual Conference of the International Speech Communication Association, 2014.

* cited by examiner

FIG. 4

| Audio Data | Profile Identifier | Intent Indicator | Speech Frames |
|---|---|---|---|
| 12345 | 123 | <PlayMusic> | 50 |
| 23456 | 234 | <OutputWeather> | 100 |
| 34567 | 123 | <BookRide> | 150 |
| 45678 | 345 | <SetTimer> | 125 |
| 56789 | 456 | <UnlockDoor> | 130 |

FIG. 5

| Voice Profile Audio Data | Profile Identifier |
|---|---|
| 12345 | 123 |
| 23456 | 234 |
| 34567 | 123 |
| 45678 | 345 |
| 56789 | 456 |

VOICE PROFILE UPDATING

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 4 is a conceptual diagram of a feature vector storage according to embodiments of the present disclosure.

FIG. 5 is a conceptual diagram of an anonymous voice profile feature vector storage according to embodiments of the present disclosure.

DETAILED DESCRIPTION

Figure 1:
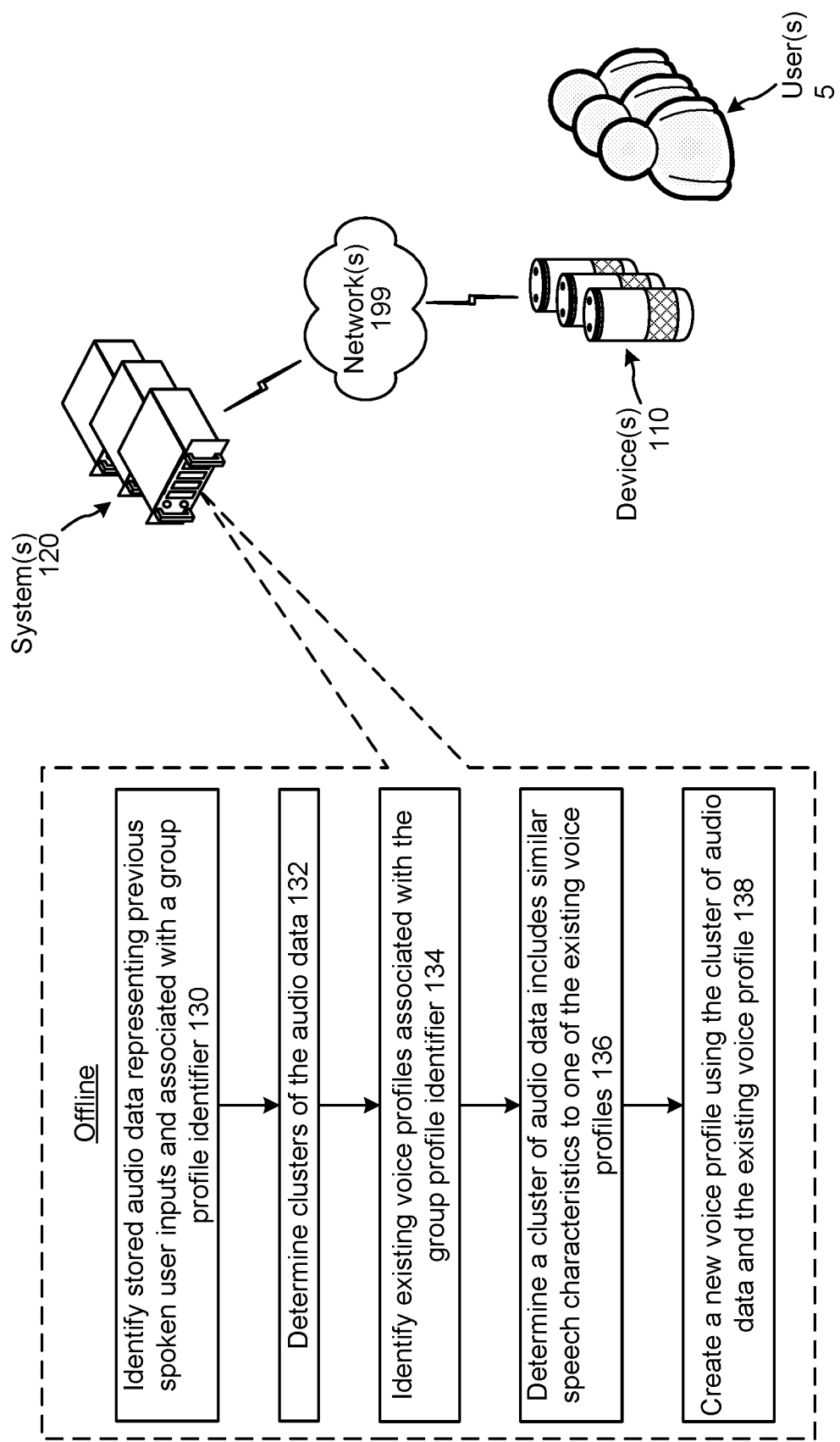
FIG. 1 illustrates a system configured to update voice profiles using clustering techniques according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions in response to user inputs. For example, for the user input of "Alexa, play music," a system may determining an identity of the user that provided the user input, and may output music associated with a playlist of the user. For further example, for the user input of "Alexa, call mom," a system may determining an identity of the user that provided the user input, determine a contact list associated with the user, determining a contact entry corresponding to "mom," and initiate 2-way communication between the device that captured the user input and a device associated with the contact entry "mom."

A system may identify a user based on characteristics of speech. For example, when a user input is received as speech, the system may process the speech to determine characteristics of the speech, and compare the characteristics to stored speech characteristics of one or more users of the system. Stored speech characteristics of a user may be referred to as a voice profile of that user.

A system implementing the present disclosure may require user permission to perform the teachings herein. That is, a system may require a user opt in, with informed consent, prior to the system being able to implement the teachings herein with respect to one or more users of a device(s). Such requirement of informed consent ensures, in at least some instances, that a system implementing the present disclosure complies with laws, regulations, standards, and the like governing where the system and/or device(s) are located. Such requirement also assists in maintaining transparency with users of the system regarding how their information is used.

A user's voice may change over time. For example, a user's speech may have certain characteristics when the user's voice profile is initially configured. Thereafter, due to aging, sickness, etc., the user's voice may have different characteristics. In at least some instances, if the foregoing speech characteristics are significantly different, speech of the user having the latter aforementioned characteristics may not be recognized as being spoken by the user since the user's voice profile was configured using speech having the former aforementioned characteristics.

Other undesired situations relevant to identifying a speaking user may also arise based on device characteristics. For example, a user's voice profile may be initially configured using speech input to a device having certain audio capture capabilities and certain environmental conditions (e.g., noise). Sometime thereafter the user may interact with another device having different audio capture capabilities and different environmental conditions. In some instances, if the audio capture capabilities and environmental conditions of the different devices are significantly different, speech of the user provided to the second device may not be recognized as being spoken by the user since the user's voice profile was configured based on the first device's capabilities and surroundings.

The present disclosure improves user recognition by providing techniques for adapting a user's voice profile over time. That is, a system may be configured to update a user's voice profile to account for speech characteristic changes resulting from, for example, a user aging, device characteristics, and the like.

In an example, a user's voice profile may be configured based on the user explicitly enrolling in a system's user recognition functionality. For example, a user may initiate an enrollment process in which the user speaks utterances requested by the system, such as repeating a wakeword a number of times, reading a series of short phrases, or repeating a series of words as requested by the system. The system may generate audio data from the speech and generate a voice profile representing the user's speech from the audio data. The system may associate the voice profile with a user identifier of a known user. A known user is a user that has voluntarily provided the system with various additional personally-identifiable information (e.g., a name, user name, email address, phone number, etc.). A voice profile associated with a known user identifier may be referred to herein as an explicit voice profile.

In another example, a voice profile may be generated without requiring a user speak particular speech for the purposes of enrolling in the system's user recognition functionality. A user may provide the system with permission to generate voice profiles for one or more users that interact with a device or group of devices (e.g., devices associated with a particular household). After receiving such permission and when a user input is received by the device(s), the system may determine speech characteristics representing the user input. The system may cluster user inputs associated with similar speech characteristics. For example, a single user may speak various inputs to a device(s) after the system receives permission to generate voice profiles for one or more users that interact with the device(s). Even though the user's inputs may be substantively different (e.g., may request the system perform different actions), the different inputs of the user may have similar or identifying speech characteristics (e.g., pitch, tone, etc.). Thus, when the system generates a voice profile by clustering the user inputs having the same or similar speech characteristics, the system is effectively generating a voice profile specific to a user even though the system does not know which user provided the inputs. This type of voice profile may be referred to as an anonymous voice profile as it is not associated with a user identifier representing a known user to the system.

The system may use clustering techniques to update voice profiles over time. When the system receives audio data representing a spoken user input, the system may store the audio data along with a user identifier (representing a user that spoke the input) and/or a device identifier (representing a device that captured the input). Periodically, the system may recall, from storage, audio data (representing previous user inputs) associated with a particular user identifier, device identifier, group of user identifiers (e.g., associated with a same household profile), or group of device identifiers (e.g., associated with a same household profile).

The system may identify clusters of the audio data, with each cluster including similar or identical speech characteristics. The system may determine a cluster is substantially similar to an existing explicit or anonymous voice profile. If this occurs, the system may add the cluster of audio data to the similar explicit or anonymous voice profile. Adding the cluster to the existing voice profile effectively updates the existing voice profile to account for changed speech characteristics of the user represented in the cluster of audio data.

In addition to or instead of performing clustering to figure out whether audio data (representing user inputs) is similar to an existing voice profile, the system may leverage various context signals to label specific audio data as being associated with a particular user identifier (and by extension a particular existing voice profile). For example, when a user speaks a user input to the system, the system may not be confident in recognizing the user's speech. After the user speaks the user input, the user may further interact with the system to provide the system with further information needed to perform an action responsive to the user input. Such further information may include non-spoken user verification information (e.g., user login information to a particular service of the system, etc.). Based on such user verification information, the system may label the previously spoken user input to indicate it originated from the particular user. For example, the system may associate audio data, representing the previous spoken user input, with a user identifier corresponding to the user.

System usage history may also or alternatively be used to retroactively associate audio data, representing a spoken user input, with a particular user. For example, a user may speak a user input requesting the output of a particular type of music (e.g., classical, rock, jazz, etc.). The system may maintain a record of user inputs received with respect to a group of user identifiers (e.g., a household profile). The system may process the record of previous user inputs to identify patterns, such as which user identifiers are routinely associated with requests for particular types of music. For example, the system may identify that a first user identifier of the group profile routinely requests the output of jazz music, a second user identifier of the group profile routinely requests the output of classical music, etc. Based on the identified patterns, the system may determine it is likely that the current user input was spoken by a particular user, and may associate audio data (representing the user input) with the user's user identifier.

Other context signals may be used to retroactively associate user inputs with particular user identifiers.

One skilled in the art will appreciate that the foregoing processes may be performed during offline operations and/or at runtime depending on system configuration.

FIG. 1 illustrates a system configured to update voice profiles using clustering techniques. Although the figures and discussion illustrate certain operational steps of the system in a particular order, the steps described may be performed in a different order (as well as certain steps removed or added) without departing from the intent of the disclosure. As illustrated in FIG. 1, the system may include one or more devices 110, local to one or more users 5, connected to one or more systems 120 across one or more networks 199.

Each device(s) 110 may be associated with a respective device identifier. The device identifier(s) of the device(s) 110 may be associated with a group profile identifier, such as that of a household profile. Each user(s) 5 may be associated with a respective user identifier. The user identifier(s) of the user(s) 5 may be associated with the group profile identifier.

As such, the group profile identifier may include one or more device identifiers and/or one or more user identifiers.

The user(s) 5 may speak user inputs to the device(s) 110. A device 110 that captured audio representing a spoken user input may generate audio data representing the audio and may send the audio data to the system(s) 120. The system(s) 120 may associate, in storage, the audio data with a group profile identifier including the device identifier of the device 110 that captured the user input.

Periodically (e.g., once a month, once a week, etc.), the system(s) 120 may identify stored audio data associated with the most recent period (e.g., last month, last week, etc.). The system(s) 120 may identify (130) stored audio data associated with a group profile identifier.

The system(s) 120 may determine (132) clusters of the audio data, with each cluster including similar or identical speech characteristics. Since each cluster includes similar or identical speech characteristics, it is likely that each cluster represents a different user that spoke user inputs to the device(s) 110 associated with the group profile.

The system(s) 120 may identify (134) existing voice profiles associated with the group profile identifier. These existing voice profiles may include explicit voice profiles and/or anonymous voice profiles.

The system(s) 120 may determine (136) a cluster of audio data includes similar speech characteristics to one of the existing voice profiles. Thereafter, the system(s) 120 may create (138) a new voice profile using the cluster of audio data and the corresponding existing voice profile. This effectively updates the existing voice profile to account for deviations of speech characteristics that may be present in the cluster of audio data, even though such deviations are not significant enough to prevent the system(s) 120 from determining the cluster of audio data is similar to the existing voice profile.

An existing voice profile may be associated with a respective user identifier. In the case of an explicit voice profile, the user identifier may correspond to a user of the system(s) 120 that has provided the system(s) 120 with various personally-identifiable information (e.g., a name, user name, email address, phone number, etc.), which may be represented in a "traditional" user profile. In the case of an anonymous voice profile, the user identifier may correspond to what the system(s) 120 perceives as a single user, but which has not provided the system(s) 120 with personally-identifiable information. When the system(s) 120 creates the new voice profile at step 138, the system(s) 120 may associate the new voice profile with the same user identifier that was associated with the previously existing voice profile.

One or more of steps 130-138 may be performed during offline operations. For example, steps 130-138 may be performed during offline operations and the voice profile (created at step 138) may be used at runtime.

In at least some examples, the system(s) 120 may use user feedback to determine whether audio data should be used to update a voice profile. For example, the system(s) 120 may receive a user input that the system(s) 120 determines corresponds to a voice profile. The system(s) 120 may generate content representing, at least in part, a name associated with the voice profile. An example of such generated content may be "playing a music station for you Joe," where "Joe" corresponds to the name associated with the voice profile. If the user is not "Joe," the system(s) 120 may receive an indication of such from a device 110. The indication may be received as a further user input. Based on the indication, the system(s) 120 may use the original user input as a negative utterance for purposes of Joe's voice profile, in the above example.

Figure 2:
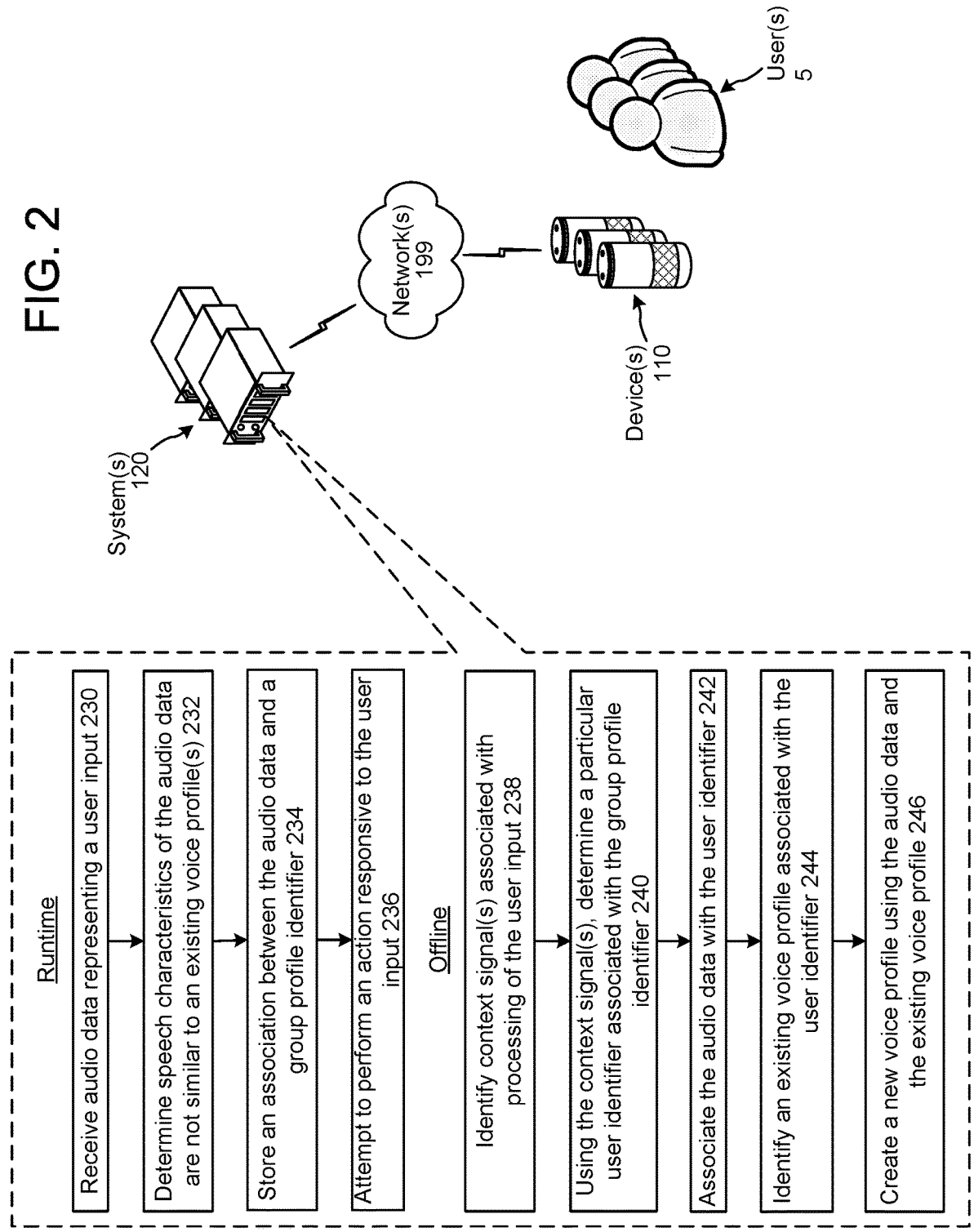
FIG. 2 illustrates a system configured to update voice profiles using audio data associated with particular user identifiers based on context information according to embodiments of the present disclosure.

In addition or alternatively to updating voice profiles using clustering techniques, the system(s) 120 may update voice profiles using audio data associated with particular user identifiers based on context information (as illustrated in FIG. 2). At runtime, a device 110 may receive audio representing a spoken user input of a user 5. The device 110 may generate audio data, representing the audio, and may send the audio data to the system(s) 120, which the system receives (230).

The system(s) 120 may determine (232) speech characteristics of the audio data are not sufficiently similar to an existing voice profile. In an example, the system(s) 120 may determine a device identifier representing the device 110 that received the user input, may determine a group profile identifier including the device identifier, may determine voice profiles associated with the group profile identifier, and may determine the speech characteristics of the audio data are not sufficiently similar to the voice profiles associated with the group profile identifier. Before or after determining the speech characteristics of the audio data are not sufficiently similar to the existing voice profiles, the system(s) 120 may store (234) an association between the audio data and the group profile identifier.

There may be instances when a device identifier is associated with a particular user identifier and not a group profile identifier, but the system(s) 120 may nonetheless not be able to determine the speech characteristics correspond to a voice profile associated with the user identifier. Such may occur when an individual, not corresponding to the user identifier, speaks the user input. In this situation, the system(s) 120 may store an association between the audio data and the user identifier and/or a device identifier representing the device 110 that received the user input.

The system(s) 120 may attempt (236) to perform an action responsive to the user input. Such may include the system(s) 120 requesting further user inputs from the user 5 in order to perform an appropriate action (e.g., output proper music, etc.).

Various related user inputs and system outputs may be referred to as a "dialog," "dialog session," "session," or the like. Related user inputs and system outputs may correspond to an ongoing exchange between a user and the system(s) 120. When the system(s) 120 receives a user input, the system(s) 120 may associate the data (e.g., audio data) representing the user input with a session identifier. The session identifier may be associated with various speech processing data (e.g., ASR results data, NLU results data, etc.) related to processing of the user input. When the system(s) 120 invokes a skill (or other component of the system), the system(s) 120 may send the session identifier to the skill (or other component) in addition to NLU results data. If the skill (or other component) outputs data for presentment to the user, the skill (or other component) may associate the data with the session identifier. The foregoing is illustrative and, thus, one skilled in the art will appreciate that a session identifier may be used to track data transmitted between various components of the system(s) 120.

During offline operations, the system(s) 120 may identify (238) one or more context signals associated with processing of the user input. Such context signals may provide insight to the system(s) 120 as to which user spoke the user input. For example, the system(s) 120 may determine the that after the user provided the spoken user input, but as part of the same dialog, the user provided user verification information identifying the user.

The system(s) 120 may be configured to generate a user interface whereby a user may listen to previously spoken user inputs. The user may provide input (e.g., by text or selection of a virtual button) representing a user's name who spoke the speech in a previously spoken user input.

The system(s) 120 may, using the context signal(s), determine (240) a particular user identifier associated with the group profile identifier. For example, the system(s) 120 may determine a user profile identifier associated with user verification information provided during a dialog. For further example, the system(s) 120 may determine a user profile identifier associated with a user's indication of a user name associated with a particular previous spoken user input.

The system(s) 120 may associate (242) the audio data, stored at step 234, with the user identifier determined at step 240. The system(s) 120 may identify (244) an existing voice profile associated with the user identifier and may create (246) a new voice profile using the audio data and the existing voice profile.

Figure 3:
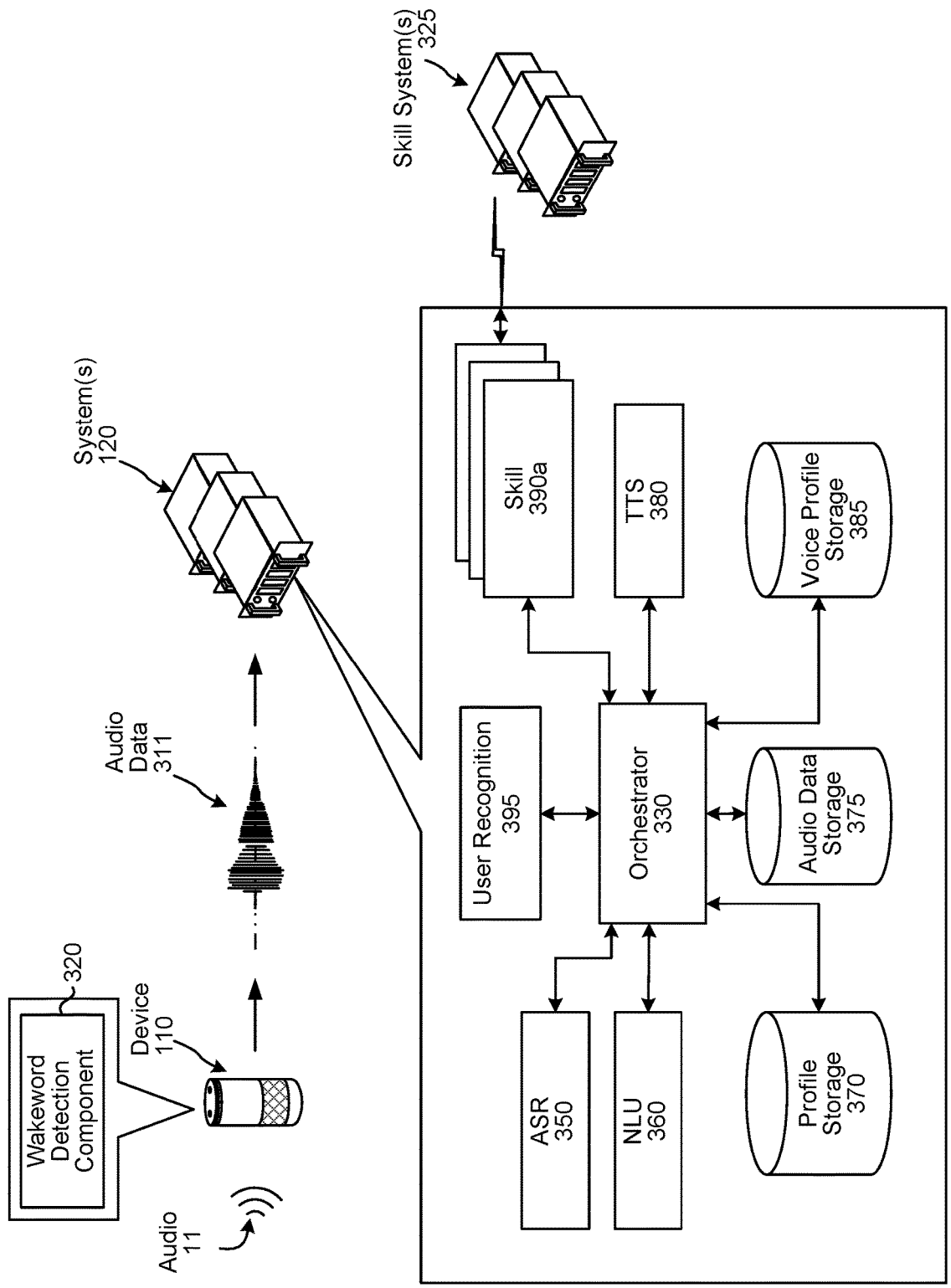
FIG. 3 is a conceptual diagram of components of a system according to embodiments of the present disclosure.

The overall system of the present disclosure may operate using various components as illustrated in FIG. 3. The various components may be located on same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 320 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 320 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 320 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 311, representing the audio 11, to the system(s) 120. The audio data 311 may include data corresponding to the wakeword, or the portion of the audio corresponding to the wakeword may be removed by the device 110 prior to sending the audio data 311 to the system(s) 120.

Upon receipt by the system(s) 120, the audio data 311 may be sent to an orchestrator component 330. The orchestrator component 330 may include memory and logic that enables the orchestrator component 330 to transmit various pieces and forms of data to various components of the system, as well as perform other operations as described herein.

The orchestrator component 330 sends the audio data 311 to an ASR component 350. The ASR component 350 transcribes the audio data 311 into text data. The text data output by the ASR component 350 represents one or more than one (e.g., in the form of an N-best list) ASR hypotheses representing speech represented in the audio data 311. The ASR component 350 interprets the speech in the audio data 311 based on a similarity between the audio data 311 and pre-established language models. For example, the ASR component 350 may compare the audio data 311 with models for sounds (e.g., subword units, such as phonemes, etc.) and sequences of sounds to identify words that match the sequence of sounds of the speech represented in the audio data 311. The ASR component 350 outputs text data representing one or more ASR hypotheses. The text data output by the ASR component 350 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated.

The NLU component 360 receives the ASR hypothesis/hypotheses (i.e., text data) attempts to make a semantic interpretation of the phrase(s) or statement(s) represented therein. That is, the NLU component 360 determines one or more meanings associated with the phrase(s) or statement(s) represented in the text data based on words represented in the text data. The NLU component 360 determines an intent representing an action that a user desires be performed as well as pieces of the text data that allow a device (e.g., the device 110, the system(s) 120, a skill 390, a skill system(s)

325, etc.) to execute the intent. For example, if the text data corresponds to "play Adele music," the NLU component 360 may determine an intent that the system(s) 120 output music and may identify "Adele" as an artist. For further example, if the text data corresponds to "what is the weather," the NLU component 360 may determine an intent that the system(s) 120 output weather information associated with a geographic location of the device 110. In another example, if the text data corresponds to "turn off the lights," the NLU component 360 may determine an intent that the system(s) 120 turn off lights associated with the device(s) 110 or the user(s) 5.

The NLU component 360 may send NLU results data (which may include tagged text data, indicators of intent, etc.) to the orchestrator component 330. The orchestrator component 330 may send the NLU results data to a skill(s) 390. If the NLU results data includes a single NLU hypothesis, the orchestrator component 330 may send the NLU results data to the skill(s) 390 associated with the NLU hypothesis. If the NLU results data includes an N-best list of NLU hypotheses, the orchestrator component 3330 may send the top scoring NLU hypothesis to a skill(s) 390 associated with the top scoring NLU hypothesis.

A "skill" may be software running on the system(s) 120 that is akin to a software application running on a traditional computing device. That is, a skill 390 may enable the system(s) 120 to execute specific functionality in order to provide data or produce some other requested output. The system(s) 120 may be configured with more than one skill 390. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 390 may operate in conjunction between the system(s) 120 and other devices, such as the device 110, in order to complete certain functions. Inputs to a skill 390 may come from speech processing interactions or through other interactions or input sources. A skill 390 may include hardware, software, firmware, or the like that may be dedicated to a particular skill 390 or shared among different skills 390.

In addition or alternatively to being implemented by the system(s) 120, a skill 390 may be implemented by a skill system(s) 325. Such may enable a skill system(s) 325 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a single skill 390 dedicated to interacting with more than one skill system 325.

Unless expressly stated otherwise, reference to a skill, skill device, or skill component may include a skill 390 operated by the system(s) 120 and/or skill operated by the skill system(s) 325. Moreover, the functionality described herein as a skill may be referred to using many different terms, such as an action, bot, app, or the like.

The system(s) 120 may include a TTS component 380 that generates audio data (e.g., synthesized speech) from text data using one or more different methods. Text data input to the TTS component 380 may come from a skill 390, the orchestrator component 330, or another component of the system(s) 120.

In one method of synthesis called unit selection, the TTS component 380 matches text data against a database of recorded speech. The TTS component 380 selects matching units of recorded speech and concatenates the units together to form audio data. In another method of synthesis called parametric synthesis, the TTS component 380 varies parameters such as frequency, volume, and noise to create audio data including an artificial speech waveform. Parametric synthesis uses a computerized voice generator, sometimes called a vocoder.

The system(s) 120 may include profile storage 370. The profile storage 370 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 370 may include one or more user profiles, with each user profile being associated with a different user identifier. Each user profile may include various user identifying information. Each user profile may also include preferences of the user and/or one or more device identifiers, representing one or more devices registered to the user.

The profile storage 370 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 370 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The system(s) 120 may include an audio data storage 375. Each portion of audio data, in the audio data storage 375 may represent a different user input. As illustrated in FIG. 4, each portion of audio data may be associated with a profile identifier (e.g., a device profile identifier and/or group profile identifier). Each portion of audio data may also be associated with an intent indicator (representing an intent of the user input represented in the audio data), a number of frames of the audio data, as well as other data not explicit illustrated.

As described, audio data representing user inputs is stored in the audio data storage 375. In some configurations, user recognition feature vectors, representing audio data, may be stored in the audio data storage 375 in addition to or instead of storing the underlying audio data. As processing performed to create user recognition feature vectors may change, it may be beneficial to store the underlying audio data as such storage enables the system(s) 120 to create a voice profile for a user using the most up-to-date processing that is available to the system(s) 120. In other words, if only a user recognition feature vector is stored, the user profile represented thereby cannot be recreated to take advantage of new user recognition feature vector processing implemented after creation of the initial user recognition feature vector.

The system(s) 120 may include a voice profile storage 385. As illustrated in FIG. 5, each voice profile (represented as voice profile audio data in FIG. 5) may be associated with a profile identifier (e.g., device profile identifier, user profile identifier, and/or group profile identifier).

While FIG. 3 illustrates the profile storage 370, the audio data storage 375, and the voice profile feature storage 385 as being separate storages, one skilled in the art will appreciate that some or all of these storages may be combined.

Figure 6:
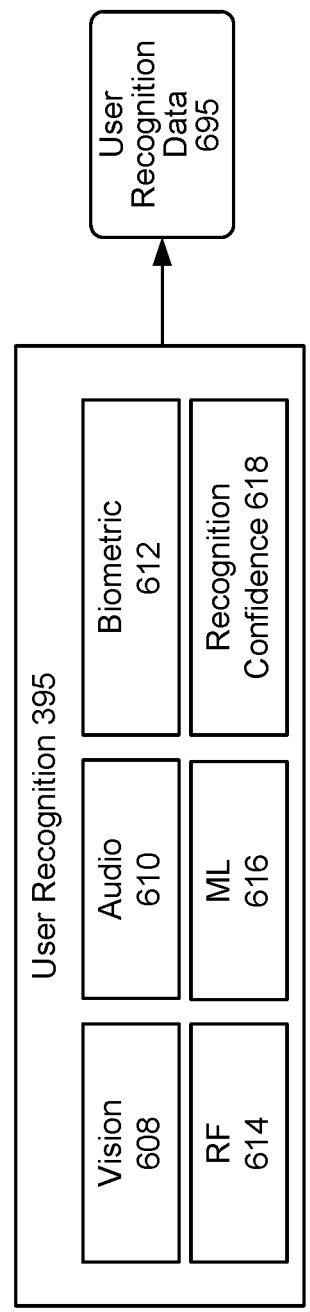
FIG. 6 is a schematic diagram of an illustrative architecture in which sensor data is combined to recognize one or more users according to embodiments of the present disclosure.

The system(s) 120 may include a user recognition component 395 that recognizes one or more users using a variety of data. As illustrated in FIG. 6, the user recognition component 395 may include one or more subcomponents including a vision component 608, an audio component 610, a biometric component 612, a radio frequency (RF) component 614, a machine learning (ML) component 616, and a recognition confidence component 618. In some instances, the user recognition component 395 may monitor data and determinations from one or more subcomponents to determine an identity of one or more users associated with data input to the system(s) 120. The user recognition component 395 may output user recognition data 695, which may include a user identifier associated with a user the user recognition component 395 believes is originating data input to the system(s) 120. The user recognition data 695 may be used to inform processes performed by various components of the system(s) 120.

The vision component 608 may receive data from one or more sensors capable of providing images (e.g., cameras) or sensors indicating motion (e.g., motion sensors). The vision component 608 can perform facial recognition or image analysis to determine an identity of a user and to associate that identity with a user profile associated with the user. In some instances, when a user is facing a camera, the vision component 608 may perform facial recognition and identify the user with a high degree of confidence. In other instances, the vision component 608 may have a low degree of confidence of an identity of a user, and the user recognition component 395 may utilize determinations from additional components to determine an identity of a user. The vision component 608 can be used in conjunction with other components to determine an identity of a user. For example, the user recognition component 395 may use data from the vision component 608 with data from the audio component 610 to identify what user's face appears to be speaking at the same time audio is captured by a device 110 the user is facing for purposes of identifying a user who spoke an input to the system(s) 120.

The overall system of the present disclosure may include biometric sensors that transmit data to the biometric component 612. For example, the biometric component 612 may receive data corresponding to fingerprints, iris or retina scans, thermal scans, weights of users, a size of a user, pressure (e.g., within floor sensors), etc., and may determine a biometric profile corresponding to a user. The biometric component 612 may distinguish between a user and sound from a television, for example. Thus, the biometric component 612 may incorporate biometric information into a confidence level for determining an identity of a user. Biometric information output by the biometric component 612 can be associated with specific user profile data such that the biometric information uniquely identifies a user profile of a user.

The RF component 614 may use RF localization to track devices that a user may carry or wear. For example, a user (and a user profile associated with the user) may be associated with a device. The device may emit RF signals (e.g., Wi-Fi, Bluetooth®, etc.). A device may detect the signal and indicate to the RF component 614 the strength of the signal (e.g., as a received signal strength indication (RSSI)). The RF component 614 may use the RSSI to determine an identity of a user (with an associated confidence level). In some instances, the RF component 614 may determine that a received RF signal is associated with a mobile device that is associated with a particular user identifier.

In some instances, a device 110 may include some RF or other detection processing capabilities so that a user who speaks an input may scan, tap, or otherwise acknowledge his/her personal device (such as a phone) to the device 110. In this manner, the user may "register" with the system(s) 120 for purposes of the system(s) 120 determining who spoke a particular input. Such a registration may occur prior to, during, or after speaking of an input.

The ML component 616 may track the behavior of various users as a factor in determining a confidence level of the identity of the user. By way of example, a user may adhere to a regular schedule such that the user is at a first location during the day (e.g., at work or at school). In this example, the ML component 616 would factor in past behavior and/or trends in determining the identity of the user that provided input to the system(s) 120. Thus, the ML component 616 may use historical data and/or usage patterns over time to increase or decrease a confidence level of an identity of a user.

In at least some instances, the recognition confidence component 618 receives determinations from the various components 608, 610, 612, 614, and 616, and may determine a final confidence level associated with the identity of a user. In some instances, the confidence level may determine whether an action is performed in response to a user input. For example, if a user input includes a request to unlock a door, a confidence level may need to be above a threshold that may be higher than a threshold confidence level needed to perform a user request associated with playing a playlist or sending a message. The confidence level or other score data may be included in the user recognition data 695.

The audio component 610 may receive data from one or more sensors capable of providing an audio signal (e.g., one or more microphones) to facilitate recognition of a user. The audio component 610 may perform audio recognition on an audio signal to determine an identity of the user and associated user identifier. In some instances, aspects of the system(s) 120 may be configured at a computing device (e.g., a local server). Thus, in some instances, the audio component 610 operating on a computing device may analyze all sound to facilitate recognition of a user. In some instances, the audio component 610 may perform voice recognition to determine an identity of a user.

The audio component 610 may also perform user identification based on audio data 311 input into the system(s) 120 for speech processing. The audio component 610 may determine scores indicating whether speech in the audio data 311 originated from particular users. For example, a first score may indicate a likelihood that speech in the audio data 311 originated from a first user associated with a first user identifier, a second score may indicate a likelihood that speech in the audio data 311 originated from a second user associated with a second user identifier, etc. The audio component 610 may perform user recognition by comparing speech characteristics represented in the audio data 311 to stored speech characteristics of users (e.g., stored voice profiles associated with the device 110 that captured the spoken user input).

Figure 7:
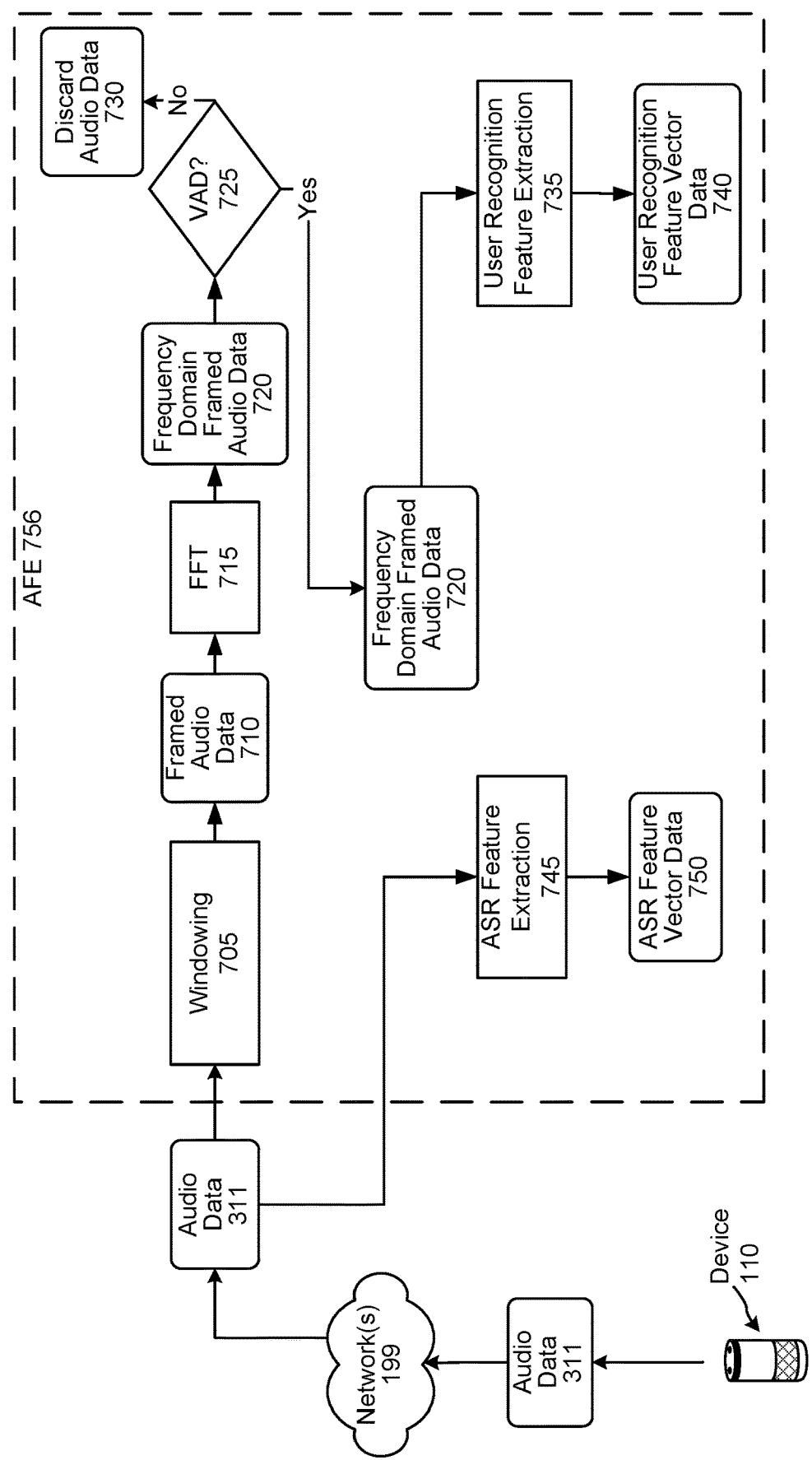
FIG. 7 is a flow diagram illustrating processing that may be performed to prepare audio data for ASR processing and user recognition processing according to embodiments of the present disclosure.

FIG. 7 illustrates processing that may be performed to prepare the audio data 311 for ASR processing and user recognition processing. As described, the device 110 sends the audio data 311 through a network(s) 199 to the system(s) 120 for processing. The system(s) 120 may include an acoustic front end (AFE) 756 (or other component(s)) that performs various functions on the audio data 311 to prepare the audio data 311 for further downstream processing, such as ASR processing and/or user recognition processing. For example, the AFE 756 may include a windowing component 705 that performs windowing functions on the audio data 311 to create framed audio data 710 (e.g., waveforms). The size of each frame may depend upon implementation. In an example, each frame may include twenty-five (25) milliseconds (m/s) of audio data, with an overlap of the next frame of 10 ms of data, thus resulting in sliding window processing of audio data. Performing a windowing function may include multiplying a time record by a finite-length window with an amplitude that varies smoothly and gradually toward zero at its edges. By performing such, the endpoints of the waveforms of respective frames of audio data meet, resulting in a continuous waveform without sharp transitions. The AFE 756 may include a fast Fourier transform (FFT) component 715 configured to perform FFT to convert the waveforms in each frame of the framed audio data 710 from its original domain (e.g., time) to a representation in a frequency domain (thereby creating frequency domain framed audio data 720). Audio processing techniques other than or in addition to FFT may be used to transform audio data (e.g., waveforms) into data that can be processed as needed.

The AFE 756 may include a voice activity detection (VAD) component 725 that determines whether voice activity (i.e., speech) is present in the post-FFT waveforms (i.e., frequency domain framed audio data 720). In doing so, the system(s) 120 may perform VAD operations discussed above. The VAD detector (or other component) may be configured in a different order, for example the VAD detector may operate on the audio data 311 rather than on the frequency domain framed audio data 720, may operate on ASR features, etc. Various different configurations of components are possible. If there is no speech in the frequency domain framed audio data 720, the system(s) 120 discards (730) the frequency domain framed audio data 805 (i.e., removes the audio data from the processing stream). If, instead, the system(s) 120 detects speech in the frequency domain framed audio data 720, the system(s) 120 executes a user recognition feature extraction component 735 with respect to the frequency domain framed audio data 720.

The user recognition feature extraction component 735 may perform frame level feature extraction and/or utterance level feature extraction. The frame level feature extraction may determine which frame of a universal background model (UBM) the frame corresponds to. The UBM may be a Gaussian mixture model, a deep neural network, etc. The utterance level feature extraction may analyze aligned speech frames to derive feature vectors of fixed length (i.e., the user recognition feature vector data 740). The user recognition feature extraction component 735 may continue to process until voice activity is no longer detected in the frequency domain framed audio data 720, at which point the system(s) 120 may determine that an endpoint of the speech has been reached.

An ASR feature extraction component 745 may perform ASR feature extraction on all of the audio data 311 received from the device 110. Alternatively (not illustrated), the ASR feature extraction component 745 may only perform ASR feature extraction on audio data including speech (e.g., as indicated by the VAD component 725). The ASR feature extraction component 745 and/or the user recognition feature extraction component 735 may determine values (i.e., features) representing qualities of the frequency domain framed audio data 720, along with quantitating those features into values (i.e., feature vectors or audio feature vectors). The ASR feature extraction component 745 may determine ASR feature vector data 750 useful for ASR processing, and the user recognition feature extraction component 735 may determine user recognition feature vector data 740 (sometimes called an i-vector) useful for user recognition processing. The ASR feature vector data 750 and the user recognition feature vector data 740 may be the same feature vectors, different feature vectors, or may include some overlapping features. A number of approaches may be used to extract feature vectors from the frequency domain framed audio data 720, such as MFCCs, PLP techniques, neural network feature vector techniques, linear discriminant analysis, semi-tied covariance matrices, or other approaches known to those skilled in the art.

The ASR feature vector data 750 may include a different audio feature vector for each audio frame. Thus, for one 25 ms long audio frame, the ASR feature extraction component 745 may output a single ASR feature vector. The ASR feature vector data 750 may be input to the ASR component 350.

Depending on system configuration, the user recognition feature extraction component 735 may output multiple user recognition feature vectors, for example one such vector for each audio frame. Alternatively, the user recognition feature extraction component 735 may continue to input the frequency domain framed audio data 720 while the utterance is ongoing (e.g., before the endpoint of the speech is reached in the audio data 311). While the frequency domain framed audio data 720 is input, the user recognition feature extraction component 735 may accumulate or otherwise combine the frequency domain framed audio data 720 as it comes in. That is, for a certain frame's worth of frequency domain framed audio data 720 that comes in, the user recognition feature extraction component 735 may combine that frame's worth of data to the previous data received for the particular utterance. The particular method of accumulation may vary, including using an arithmetic component, a recurrent neural network (RNN), trained model, or other component capable of combining audio data. Further, the form of combination performed by the user recognition feature extraction component 735 may depend on what audio qualities are determined to be important for ultimate user recognition processing. Thus, the user recognition feature extraction component 735 may be trained to isolate and process data that is most useful for user recognition processing. The output of the user recognition feature extraction component 735 may thus include user recognition feature vector data 740 that includes values for features useful for user recognition processing. The resulting user recognition feature vector data 740 may be input to the user recognition component 395.

Figure 8:
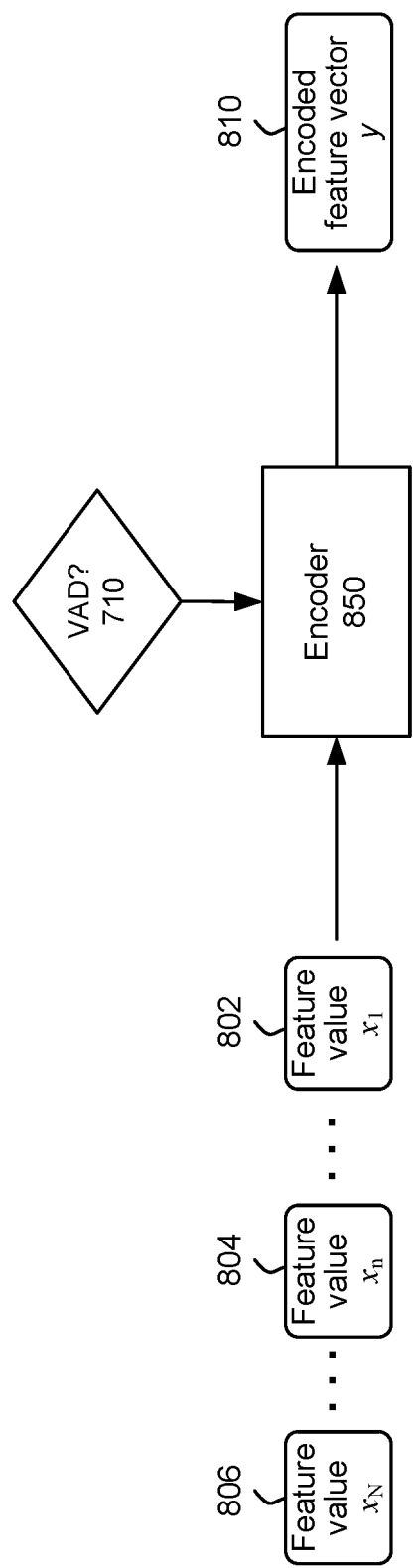
FIG. 8 is a diagram of a vector encoder according to embodiments of the present disclosure.

The user recognition feature vector data 740 may include multiple vectors each corresponding to different portions of a spoken user input. Alternatively, the user recognition feature vector data 740 may be a single vector representing audio qualities of the spoken user input. Referring to FIG. 8, the single vector may be created using an encoder 850, which can create a fixed-size vector to represent certain characteristics of the audio data as described below. In mathematical notation, given a sequence of feature data values $x_1, \ldots x_n, \ldots x_N$, with $x_n$ being a D-dimensional vector, an encoder $E(x_1, \ldots x_N) = y$ projects the feature sequence to y, with y being a F-dimensional vector. F is a fixed length of the vector and is configurable depending on use of the encoded vector and other system configurations. As shown in FIG. 8, feature values 802 through 806 (which may include feature vectors of the audio data 311, the frequency domain framed audio data 720, or the like) may be input into an encoder 850, which will output an encoded feature vector 810 that represents the input feature values. Output of the VAD component 725 may be an input into the encoder 850 such that the encoder 850 may only operate when feature values input therein correspond to speech. The individual feature values (e.g., 802-806) may correspond to specific audio frames. Regardless of how many feature values are input, any particular encoder 850 will be configured to output vectors of the same size, thus ensuring a continuity of output encoded vector size from any particular encoder 850 (though different encoders may output vectors of different fixed sizes) and enabling comparing different feature vectors y. The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder 850 may be implemented as a neural network (NN), recurrent neural network (RNN), GMM, or other model. One particular example is a long short-term memory (LSTM) RNN. There are a variety of ways for the encoder 850 to consume data input therein, including but not limited to:
   linear, one direction (forward or backward),
   bi-linear, essentially the concatenation of a forward and a backward embedding, or
   tree, based on parse-tree of the sequence.
In addition, an attention model can be used, which is another RNN or deep neural network (DNN) that learns to "attract" attention to certain parts of the input. The attention model can be used in combination with the above methods of consuming the input.

FIG. 8 illustrates operation of the encoder 850. The input feature value sequence, starting with feature value $x_1$ 802, continuing through feature value $x_n$ 804, and concluding with feature value $x_N$ 806 is input into the encoder 850. The encoder 850 may process the input feature values as noted above. The encoder 850 outputs the encoded feature vector y 810, which is a fixed length feature vector of length F. Thus, the user recognition feature extraction component 735 may include an encoder 850 that receives audio feature values for a particular spoken user input, and outputs a fixed length encoded feature vector y 810, which may be the user recognition feature/vector data 740. Thus, in certain system configurations, no matter how long the spoken user input is, or how many acoustic frames worth of feature values are input into the encoder 850, the output feature vector 810/740 will be of the same length, thus allowing for more ease of performing user recognition processing by the user recognition component 395. To allow for robust system operation, a final vector 810/740 may include many dimensions (e.g., several hundred), thus providing many datapoints for downstream consideration.

To determine the user recognition feature vector data 740, the system(s) 102 may (for example using the VAD component 725) determine that voice activity is detected in input audio data. This may indicate the beginning of the spoken user input, thus resulting in the system(s) 120 determining that the spoken user input starts at a first point in audio data. Audio processing (for example performed by the windowing component 705, the FFT component 715, the ASR feature extraction component 745, the user recognition feature extraction component 735, ASR processing, or the like) may continue on audio data starting at the first point and continuing until the VAD component 725 determines that voice activity is no longer detected at a second point in audio data. Thus, the system(s) 120 may determine that the spoken user input ends at the second point. Thus, the first point may be considered the beginpoint of the spoken user input and the second point may be considered the endpoint of the spoken user input. The VAD component 725 may signal the user recognition feature extraction component 735 when the beginpoint and/or endpoint is detected so that the user recognition feature extraction component 735 may begin processing audio data starting at the beginpoint and ending at the endpoint. Further, audio frames during the spoken user input that do not include speech may be filtered out by the VAD component 725 and thus not considered by the ASR feature extraction component 745 and/or the user recognition feature extraction component 735. The resulting accumulated/processed speech audio data (from beginpoint to endpoint) may then be represented in a single feature vector for the user recognition feature vector data 740, which may then be used for user recognition processing.

Figure 9:
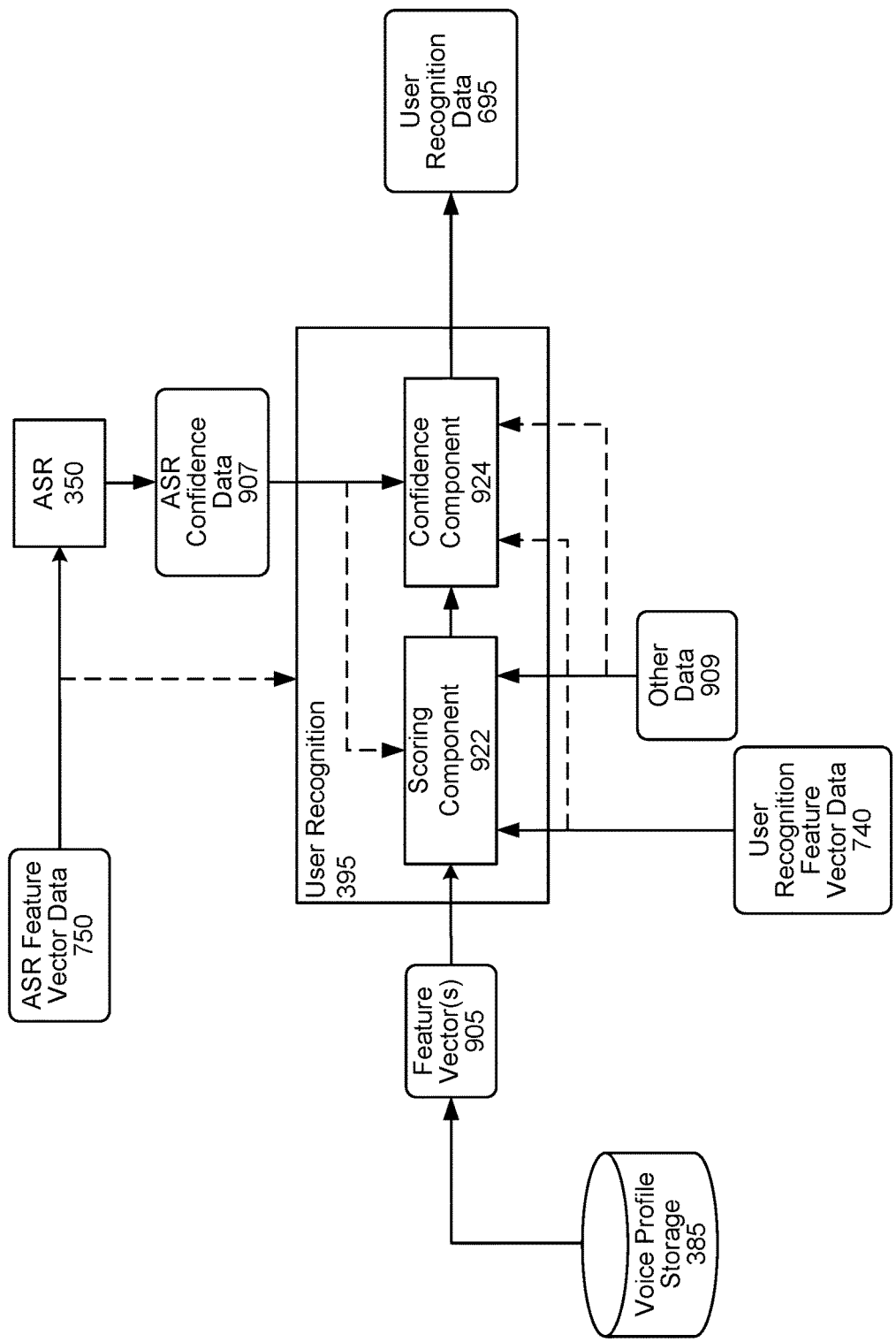
FIG. 9 is a system flow diagram illustrating user recognition according to embodiments of the present disclosure.

FIG. 9 illustrates user recognition processing as may be performed by the user recognition component 395. The ASR component 350 performs ASR processing on the ASR feature vector data 750 as described above. ASR confidence data 907 may be passed to the user recognition component 395.

The user recognition component 395 performs user recognition using various data including the user recognition feature vector data 740, feature vectors 905 representing explicit and/or anonymous voice profiles, the ASR confidence data 907, and other data 909. The user recognition component 395 may output the user recognition data 695, which reflects a certain confidence that the user input was spoken by one or more particular users. The user recognition data 695 may include one or more user identifiers (e.g., corresponding to one or more explicit voice profiles and/or one or more anonymous voice profiles). Each user identifier in the user recognition data 695 may be associated with a respective confidence value, representing a likelihood that the user input corresponds to the user identifier. A confidence value may be a numeric or binned value.

The feature vector(s) 905 input to the user recognition component 395 may correspond to one or more anonymous voice profiles and/or one or more explicit voice profiles. The user recognition component 395 may use the feature vector(s) 905 to compare against the user recognition feature vector 740, representing the present user input, to determine whether the user recognition feature vector 740 corresponds to one or more of the feature vectors 905 of the anonymous and/or explicit voice profiles.

Each feature vector 905 may be the same size as the user recognition feature vector 740. For example, if the user recognition feature vector 704 is of size F (for example encoded by the encoder 850), a feature vector 905 may also be of size F.

To perform user recognition, the user recognition component 395 may determine the device 110 from which the audio data 311 originated. For example, the audio data 311 may be associated with metadata including a device identifier representing the device 110. Either the device 110 or the system(s) 120 may generate the metadata. The system(s) 120 may determine a group profile identifier associated with the device identifier, may determine user identifiers associated with the group profile identifier, and may include the group profile identifier and/or the user identifiers in the metadata. The system(s) 120 may associate the metadata with the user recognition feature vector 740 produced from the audio data 311. The user recognition component 395 may send a signal to the voice profile storage 385, with the signal requesting only audio data and/or feature vectors 905 (depending on whether audio data and/or corresponding feature vectors are stored) associated with the device identifier, the group profile identifier, and/or the user identifiers represented in the metadata. This limits the universe of possible feature vectors 905 the user recognition component 395 considers at runtime and thus decreases the amount of time to perform user recognition processing by decreasing the amount of feature vectors 905 needed to be processed. Alternatively, the user recognition component 395 may access all (or some other subset of) the audio data and/or feature vectors 905 available to the user recognition component 395. However, accessing all audio data and/or feature vectors 905 will likely increase the amount of time needed to perform user recognition processing based on the magnitude of audio data and/or feature vectors 905 to be processed.

If the user recognition component 395 receives audio data from the voice profile storage 385, the user recognition component 395 may generate one or more feature vectors 905 corresponding to the received audio data.

The user recognition component 395 may attempt to identify the user that spoke the speech represented in the audio data 311 by comparing the user recognition feature vector 740 to the feature vector(s) 905. The user recognition component 395 may include a scoring component 922 that determines respective scores indicating whether the user input (represented by the user recognition feature vector 740) was spoken by one or more particular users (represented by the feature vector(s) 905). The user recognition component 395 may also include a confidence component 924 that determines an overall accuracy of user recognition processing (such as those of the scoring component 922) and/or an individual confidence value with respect to each user potentially identified by the scoring component 922. The output from the scoring component 922 may include a different confidence value for each received feature vector 905. For example, the output may include a first confidence value for a first feature vector 905a (representing a first anonymous or explicit voice profile), a second confidence value for a second feature vector 905b (representing a second anonymous or explicit voice profile), etc. Although illustrated as two separate components, the scoring component 922 and the confidence component 924 may be combined into a single component or may be separated into more than two components.

The scoring component 922 and the confidence component 924 may implement one or more trained machine learning models (such neural networks, classifiers, etc.) as known in the art. For example, the scoring component 922 may use probabilistic linear discriminant analysis (PLDA) techniques. PLDA scoring determines how likely it is that the user recognition feature vector 740 corresponds to a particular feature vector 905. The PLDA scoring may generate a confidence value for each feature vector 905 considered and may output a list of confidence values associated with respective user identifiers, anonymous voice profile identifiers, and/or explicit voice profile identifiers. The scoring component 922 may also use other techniques, such as GMMs, generative Bayesian models, or the like, to determine confidence values.

The confidence component 924 may input various data including information about the ASR confidence 907, speech length (e.g., number of frames or other measured length of the user input), audio condition/quality data (such as signal-to-interference data or other metric data), fingerprint data, image data, or other factors to consider how confident the user recognition component 395 is with regard to the confidence values linking users to the user input. The confidence component 924 may also consider the confidence values and associated identifiers output by the scoring component 922. For example, the confidence component 924 may determine that a lower ASR confidence 907, or poor audio quality, or other factors, may result in a lower confidence of the user recognition component 395. Whereas a higher ASR confidence 907, or better audio quality, or other factors, may result in a higher confidence of the user recognition component 395. Precise determination of the confidence may depend on configuration and training of the confidence component 924 and the model(s) implemented thereby. The confidence component 924 may operate using a number of different machine learning models/techniques such as GMM, neural networks, etc. For example, the confidence component 924 may be a classifier configured to map a score output by the scoring component 922 to a confidence value.

The user recognition component 395 may output user recognition data 695 specific to a single user identifier, anonymous voice profile identifier, or explicit voice profile identifier (or one or more user identifiers, one or more anonymous voice profile identifiers, and/or one or more explicit voice profile identifiers in the form of an N-best list). For example, the user recognition component 395 may output user recognition data 695 with respect to each received feature vector 905. The user recognition data 695 may include numeric confidence values (e.g., 0.0-1.0, 0-1000, or whatever scale the system is configured to operate). Thus the user recognition data 695 may output an N-best list of potential users with numeric confidence values (e.g., user identifier 123-0.2, anonymous voice profile identifier 234-0.8). Alternatively or in addition, the user recognition data 695 may include binned confidence values. For example, a computed recognition score of a first range (e.g., 0.0-0.33) may be output as "low," a computed recognition score of a second range (e.g., 0.34-0.66) may be output as "medium," and a computed recognition score of a third range (e.g., 0.67-1.0) may be output as "high." The user recognition component 395 may output an N-best list of potential users with binned confidence value (e.g., user identifier 123—low, anonymous voice profile identifier 234—high). Combined binned and numeric confidence value outputs are also possible. Rather than a list of identifiers and their respective confidence values, the user recognition data 695 may only include information related to the top scoring identifier as determined by the user recognition component 395. The user recognition component 395 may also output an overall confidence value that the individual confidence values are correct, where the overall confidence value indicates how confident the user recognition component 395 is in the output results. The overall confidence value may be determined by the confidence component 924.

The confidence component 924 may determine differences between individual confidence values when determining the user recognition data 695. For example, if a difference between a first confidence value and a second confidence value is large, and the first confidence value is above a threshold confidence value, then the user recognition component 395 is able to recognize a first user (associated with the feature vector 905 associated with the first confidence value) as the user that spoke the user input with a much higher confidence than if the difference between the confidence values were smaller.

The user recognition component 395 may perform thresholding to avoid incorrect user recognition data 695 being output. For example, the user recognition component 395 may compare a confidence value output by the confidence component 924 to a threshold confidence value. If the confidence value does not satisfy (e.g., does not meet or exceed) the threshold confidence value, the user recognition component 395 may not output user recognition data 695, or may only include in that data 695 an indicator that a user speaking the user input could not be recognized. Further, the user recognition component 395 may not output user recognition data 695 until enough user recognition feature vector data 740 is accumulated and processed to verify a user above a threshold confidence value. Thus the user recognition component 395 may wait until a sufficient threshold quantity of audio data of the user input has been processed before outputting user recognition data 695. The quantity of received audio data may also be considered by the confidence component 924.

The user recognition component 395 may be defaulted to output binned (e.g., low, medium, high) user recognition confidence values. However, such may be problematic in certain situations. For example, if the user recognition component 395 computes a single binned confidence value for multiple feature vectors 905, the system may not be able to effectively determine which user originated the user input. In this situation, the user recognition component 395 may be configured to override its default setting and output numeric confidence values. This enables the system to determine a user, associated with the highest numeric confidence value, originated the user input.

The user recognition component 395 may use other data 909 to inform user recognition processing. A trained model(s) or other component of the user recognition component 395 may be trained to take other data 909 as an input feature when performing user recognition processing. Other data 909 may include a variety of data types depending on system configuration and may be made available from other sensors, devices, or storage. The other data 909 may include a time of day at which the audio data 311 was generated by the device 110 or received from the device 110, a day of a week in which the audio data audio data 311 was generated by the device 110 or received from the device 110, etc.

The other data 909 may include image data or video data. For example, facial recognition may be performed on image data or video data received from the device 110 from which the audio data 311 was received (or another device). Facial recognition may be performed by the user recognition component 395, or another component of the system(s) 120. The output of facial recognition processing may be used by the user recognition component 395. That is, facial recognition output data may be used in conjunction with the comparison of the user recognition feature vector 740 and one or more feature vectors 905 to perform more accurate user recognition processing.

The other data 909 may include location data of the device 110. The location data may be specific to a building within which the device 110 is located. For example, if the device 110 is located in user A's bedroom, such location may increase a user recognition confidence value associated with user A and/or decrease a user recognition confidence value associated with user B.

The other data 909 may include data indicating a type of the device 110. Different types of devices may include, for example, a smart watch, a smart phone, a tablet computer, and a vehicle. The type of the device 110 may be indicated in a profile associated with the device 110. For example, if the device 110 from which the audio data 311 was received is a smart watch or vehicle belonging to a user A, the fact that the device 110 belongs to user A may increase a user recognition confidence value associated with user A and/or decrease a user recognition confidence value associated with user B.

The other data 909 may include geographic coordinate data associated with the device 110. For example, a group profile associated with a vehicle may indicate multiple users (e.g., user A and user B). The vehicle may include a global positioning system (GPS) indicating latitude and longitude coordinates of the vehicle when the audio data 311 is generated by the vehicle. As such, if the vehicle is located at a coordinate corresponding to a work location/building of user A, such may increase a user recognition confidence value associated with user A and/or decrease user recognition confidence values of all other users indicated in a group profile associated with the vehicle. Global coordinates and associated locations (e.g., work, home, etc.) may be indicated in a profile associated with the device 110. The global coordinates and associated locations may also or alternatively be associated with one or more user profiles.

The other data 909 may include data representing activity of a particular user that may be useful in performing user recognition processing. For example, if a user has recently entered a code to disable a home security alarm, and the audio data 311 was received from a device 110 represented in a group profile associated with the home, signals from the home security alarm about the disabling user, time of disabling, etc. may be reflected in the other data 909 and considered by the user recognition component 395. If a mobile device (such as a smart phone, Tile, dongle, or other device) known to be associated with a particular user is detected proximate to (for example physically close to, connected to the same WiFi network as, or otherwise nearby) the device 110, this may be reflected in the other data 909 and considered by the user recognition component 395.

Depending on system configuration, the other data 909 may be configured to be included in the user recognition feature vector data 740 (for example using the encoder 850)

so that all the data relating to the user input to be processed by the scoring component 922 may be included in a single feature vector. Alternatively, the other data 909 may be reflected in one or more different data structures to be processed by the scoring component 922.

Various machine learning techniques may be used to train and operate models to perform various steps described herein, such as user recognition feature extraction, encoding, user recognition scoring, user recognition confidence determination, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The foregoing illustrates processes that may be performed at runtime to recognize a user that spoke a user input. As indicated previously, the system(s) 120 may be configured to update voice profiles during offline operations. Such voice profile updating may use audio data representing previous spoken user inputs, which were not requested by the system(s) 120.

Figure 10:
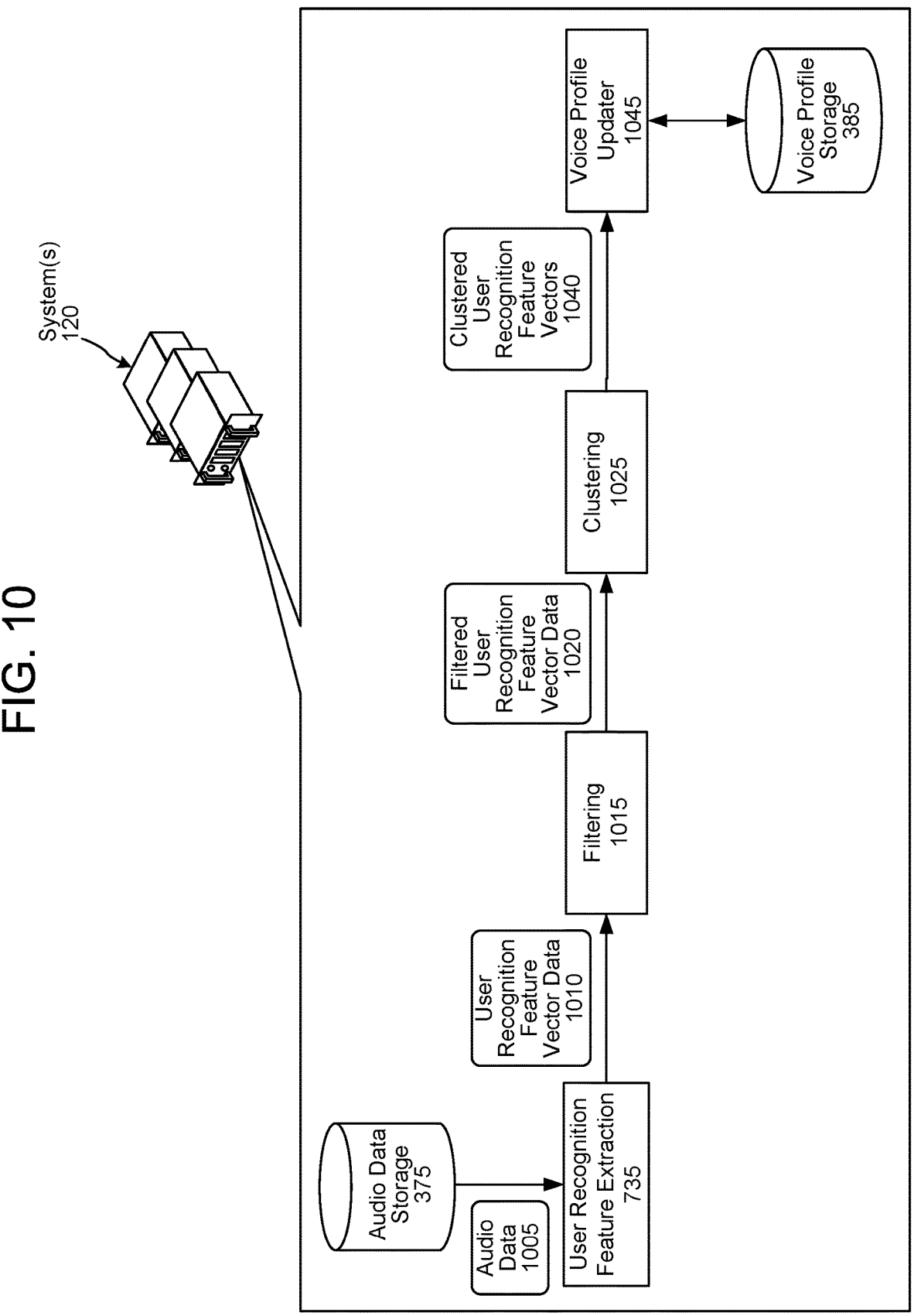
FIG. 10 is a system flow diagram illustrating the updating of a voice profile according to embodiments of the present disclosure.

As illustrated in FIG. 10, the user recognition feature extraction component 735 may receive audio data 1005 from the audio data storage 375. The audio data 1005 may correspond to a single group profile identifier (e.g., a single household profile identifier).

The user recognition feature extraction component 735 may be configured to periodically (e.g., once every month) receive audio data corresponding to a group profile identifier. In such a configuration, each time the user recognition feature extraction component 735 receives audio data, the audio data may be limited to spoken user inputs that were received after the most recent previous instance when the user recognition feature extraction component 735 receives audio data corresponding to the same group profile identifier. In other words, for example, if the user recognition feature extraction component 735 received audio data, corresponding to a group profile identifier, thirty days ago, the next allotment of audio data, received by the user recognition feature extraction component 735 and corresponding to the same group profile identifier, may be limited to audio data representing spoken user inputs received within the last 30 days.

The frequency (e.g., once a month, once a week, etc.) with which the user recognition feature extraction component 735 processes audio data corresponding to a group profile identifier may be configurable. The frequency may be configured to balance how often to update to get improved voice profiles versus computation load. For example, simply because a user may speak user inputs to a system often does not necessarily mean the user's voice profile needs to be updated.

The user recognition feature extraction component 735 may generate user recognition feature vector data 1010. The user recognition feature vector data 1010 may include a different user recognition feature vector corresponding to each respective spoken user input represented in the audio data 1005.

In some configurations, the user recognition feature vector data 740, created at runtime, may be stored along with or instead of the audio data 311. In such configurations, the offline processing described above with respect to the user recognition feature extraction component 735 may be omitted, and the runtime created user recognition feature vector data 740 may be used to update voice profiles during offline operations.

The system(s) 120 may include a filtering component 1015 configured to perform various filtering operations with respect to feature vector data input to the filtering component 1015. The filtering component 1015 may be configured to determine whether user recognition feature vectors (represented in the user recognition feature vector data 1010) should be used to update voice profiles. In other words, the filtering component 1015 may be configured to ensure downstream clustering (as described below) will provide a maximum possible gain in updating voice profiles.

The filtering component 1015 may receive the user recognition feature vector data 1010 generated by the user recognition feature extraction component 735 during offline operations. Instead or in addition, the filtering component 1015 may receive the user recognition feature vector data 740 generated by the user recognition feature extraction component 735 at runtime.

The filtering component 1015 may filter out user recognition feature vectors that do not have a sufficient length. For example, the filtering component 1015 may identify one or more user recognition feature vectors (in the received user recognition feature vector data 1010/740) that have lengths that does not satisfy a minimum threshold length, and may remove those user recognition feature vectors from downstream processing. The lengths of the user recognition feature vectors and the minimum threshold length may be measured in time (e.g., seconds), amount of audio frames, or some other length measurement.

The filtering component 1015 may filter out user recognition feature vectors that have too much noise. For example, the filtering component 1015 may identify one or more user recognition feature vectors (in the received user recognition feature vector data 1010/740) that have amounts of noise that satisfy threshold amount of noise, and may remove those user recognition feature vectors from downstream processing. The amounts of noise of the user recognition feature vectors and the threshold amount of noise may be measured using various techniques/metrics such as signal-to-noise ratio (SNR), signal-to-interference-plus-noise ratio (SINR), etc.

The filtering component 1015 may filter out user recognition feature vectors based on intent of the corresponding spoken user inputs. Such filtering ensures a voice profile is generated from various types of spoken user inputs. If a voice profile is not generated from a sufficient variety of spoken user inputs (e.g., corresponding to a variety of intents), the voice profile may be biased toward one or more particular kinds of spoken user inputs. For example, if a voice profile is mainly generated from spoken user inputs corresponding to a <PlayMusic> intent, the voice profile will be biased towards recognizing a corresponding user when the user speaks further user inputs corresponding to the <PlayMusic> intent. This may, at the same time, decrease recognition of the user when the user speaks user inputs different from the <PlayMusic> intent.

As illustrated in and described with respect to FIG. 4, stored audio data (representing a spoken user input) may be associated with an intent indicator. These intent indicator may be associated with corresponding user recognition feature vectors represented in the user recognition feature vector data 1010/740. The filtering component 1015 may be configured to limit the amount of spoken user inputs, corresponding to the same or similar intent indicator, that may be used to update a voice profile. The filtering component 1015 may determine the different intent indicators represented in the user recognition feature vector data 1010/740; determine which intent indicators are represented in the user recognition feature vector data 1010/740 at least a threshold number of times; and discard some of those user recognition feature vectors from downstream processing such that downstream processing only considers, at most, the threshold number of the same or similar intent indicator. For example, if the <PlayMusic> intent is associated with seven user recognition feature vectors and the threshold number is configured at five, the filtering component 1015 may discard at least two of the user recognition feature vectors associated with the <PlayMusic> intent.

One skilled in the art will appreciated that, if the filtering component 1015 is configured prior to clustering being performed (as described below), the foregoing filtering by the filtering component 1015 may not be performed on a voice profile specific level. This stems from the fact that the filtering component 1015, in such a configuration, us unaware of which user recognition feature vectors input thereto are similar or identical (e.g., that relate to the same user).

In at least some examples, the filtering component 1015 may be invoked after clustering is performed. This enables the filtering component 1015 to perform filtering on the voice profile level. Using the foregoing intent filtering as an example, if the filtering component 1015 is invoked post-clustering, the filtering component 1015 is able to determine, for each cluster, the different intent indicators represented in the cluster; determine which intent indicators are represented in the cluster at least a threshold number of times; and discard some of the user recognition feature vectors, of the cluster, from downstream processing. Such processing ensures each cluster contains, at most, a maximum threshold number of user recognition feature vectors associated with a similar or identical intent indicator.

The filtering component 1015 may output filtered user recognition feature vector data 1020. The filtered user recognition feature vector data 1020 may include user recognition feature vectors that were represented in the user recognition feature vector data 1010 and that were not filtered out from further processing by filtering component 1015 as described above.

The system(s) 120 may include a clustering component 1025 configured to identify clusters of user recognition feature vectors having similar or identical speech characteristics. As illustrated in FIG. 10, the clustering component 1025 may perform clustering on user recognition feature vectors represented in the filtered user recognition feature vector data 1020 output by the filtering component 1015. In systems that implement the filtering component 1015 downstream (or at least partially downstream) from the clustering component 1025, the clustering component 1025 may perform clustering on user recognition feature vectors represented in the user recognition feature vector data 1010.

The clustering component 1025 may perform a Density-Based Spatial clustering of Applications with Noise (DBSCAN) to cluster user recognition feature vectors. A DBSCAN may generate regions having different densities. A density may be considered a cluster of similar or identical user recognition feature vectors.

DBSCAN has two parameters, ε and minPts. ε dictates when two user recognition feature vectors are considered close enough to be grouped into a single cluster. Items with at least minPts neighbors within a distance of ε may be defined as "core points." Connected core points along with their ε-neighbors may form a cluster. By selecting an appropriate minPts, density of clusters can be influenced.

Density may correlate to an amount of user recognition feature vectors making up a cluster. In other words, the denser a cluster is, the more user recognition feature vectors make up the cluster.

Clustering may also be performed using other techniques. For example, individual user recognition feature vectors (or other vectors representing spoken audio data) may be clustered into K clusters using a k-means algorithm. A distance metric $d(x_i, x_j)$ may also be used to measure the distance between vectors for clustering purposes. Various known techniques, such as Cosine distance, Euclidean distance, Manhattan distance, or other techniques may be used for determining a difference between vectors. From the vector representations the system may determine K clusters where each vector (and thus the corresponding voice represented by the cluster) will be considered to be in that cluster. The number of clusters K is configurable but may be selected so that the clusters (and/or their respective centroids) are far enough from each other that the clusters are sufficiently distinct for the purposes described herein. Other clustering techniques may also be used.

After clustering is performed, the clustering component 1025 may determine there are certain user recognition feature vectors that do not belong to any clusters (e.g., do not correspond to a voice that sufficiently matches a voice of another cluster). The clustering component 1025 may discard such user recognition feature vectors such that these user recognition feature vectors are not considered in voice profile update processing.

The clustering component 1025 may output clustered user recognition feature vectors 1040, which may be received by a voice profile updater 1045. The voice profile updater 1045 may be configured to update existing explicit and anonymous voice profiles, as well as generate new anonymous (e.g., not linked to a particular user known to the system) voice profiles.

The voice profile updater 1045 may implement a model(s) trained to determine similarities between clusters of user recognition feature vectors and user recognition feature vectors representing existing explicit and anonymous voice profiles. In an example, the voice profile updater 1045 may generate a user recognition feature vector representing a received cluster of user recognition feature vectors, and determine how similar the newly created user recognition feature vector is to one or more user recognition feature vectors corresponding to one or more explicit or anonymous voice profiles. The model(s) may use linear discriminant analysis (LDA) and/or probabilistic linear discriminant analysis (PLDA) techniques. The LDA and PLDA techniques may generate respective scores representing how likely it is that a cluster of user recognition feature vectors corresponds to a particular user recognition feature vector of a particular explicit or anonymous voice profile.

Data that may be used to train the model(s), implemented by the voice profile updater 1045, may include a PLDA similarly score with a first feature vector and a second feature vector, log(total number of speech frames of estimating the first feature vector), log(total number of speech frames used for estimating the second feature vector), a number of utterances used in estimating the first feature vector, a number of utterances used in estimating the second feature vector, a total number of enrolled users, a minimum of a difference with PLDA scores of other enrolled users, etc. The log(total number of speech frames of estimating the first feature vector) and the log(total number of speech frames used for estimating the second feature vector) capture an expectation that feature vectors estimated from fewer speech frames are less reliable. The number of utterances used in estimating the first feature vector and the number of utterances used in estimating the second feature vector provide information regarding feature vector estimation. The total number of enrolled users and the minimum of a difference with PLDA scores of other enrolled users are relevant to the PLDA similarity scoring. The minimum of a difference with PLDA scores of other enrolled users capture information about how close other enrolled users match a feature vector of a particular user input, thereby lowering misidentification rates. When the number of enrolled users is less than 2, the minimum of a difference with PLDA scores of other enrolled users may be assigned a constant value equal to a difference of maximum and minimum of PLDA values observed on a development set.

A network with 3 hidden layers and 5 hidden nodes per layer may be sufficient. Output of the network may be a binary value depending on whether two compared user recognition feature vectors correspond to the same user (e.g., a binary output of 1) or not (e.g., a binary output of 0). The model(s) implemented by the voice profile updater 1045 may be trained using back-propagation with cross-entropy objective function, or one or more other training techniques.

The user profile updater 1045 may determine a cluster of user recognition feature vectors (or a user recognition feature vector generated from a cluster of user recognition feature vectors) corresponds to a user recognition feature vector representing an already established voice profile. If this occurs, the voice profile updater 1045 may update the established voice profile using at least some of the clustered user recognition feature vectors. In other words, the user profile updater 1045 may update the established voice profile if the user profile updater 1045 determines a confidence value representing a similarity of the cluster to the established voice profile, and determines the confidence value satisfies a condition (e.g., a threshold confidence value). In an example, the voice profile updater 1045 may create the updated voice profile by taking an average of the user recognition feature vector (from which the established voice profile was generated) and the at least some of the clustered user recognition feature vectors. Such processing may result in a new user recognition feature vector representing the updated voice profile. The voice profile updater 1045 may cause the new user recognition feature vector (and/or audio data from which the new user recognition feature vector originated) to be persisted in the voice profile storage 385.

In at least some implementations, the voice profile updater 1045 may update a voice profile without taking an average of user recognition feature vectors. For example, it may be beneficial to ensure feature vectors created to generate an explicit voice profile are represented in updated to the explicit voice profile for at least a threshold duration of time (e.g., several years). The voice profile updater 1045 may update a voice profile, without taking an average, but extracting statistics from the underlying utterances of the user recognition feature vectors.

As described, the voice profile updater 1045 may update a voice profile using at least some (but maybe not all) of the clustered user recognition feature vectors corresponding to the already established voice profile. This may, at least in part, occur when the system(s) 120 is configured with an upper threshold number of user recognition feature vectors that may be used to create a voice profile. For example, if an established voice profile was created using five user recognition feature vectors, if the upper threshold number of user recognition feature vectors is configured at seven, and if the cluster of user recognition feature vectors includes more than two user recognition feature vectors, the voice profile updater 1045 may select a total of seven user recognition feature vectors (from the cluster and those used to create the established voice profile) to create the updated voice profile.

The voice profile updater 1045 may consider various signals when determining which user recognition feature vectors to use to create an updated voice profile. For example, the voice profile updater 1045 may be configured to select user recognition feature vectors generated using supervised means over user recognition feature vectors generated using unsupervised means. For further example, the voice profile updater 1045 may be configured to select user recognition feature vectors of greater length, may be configured to select user recognition feature vectors based on associated intent indicators, and/or may consider other types of signals.

The user profile updater 1045 may determine a cluster of user recognition feature vectors (or a user recognition feature vector generated from a cluster of user recognition feature vectors) does not correspond to a user recognition feature vector representing an already established voice profile. When this occurs, the user profile updater 1045 may create an anonymous voice profile from the cluster of user recognition feature vectors. In other words, the user profile updater 1045 may create an anonymous voice profile if the user profile updater 1045 determines a confidence value representing a similarity of the cluster to the established voice profile, and determines the confidence value fails to satisfy a condition (e.g., a threshold confidence value). The user profile updater 1045 may store the newly created anonymous voice profile in the voice profile storage 385. The newly created anonymous voice profile may be associated with a device identifier and/or group profile identifier.

The voice profile updater 1045 may only generate an anonymous voice profile feature vector from a cluster of similar user recognition feature vectors if the cluster has at least a minimum number of user recognition feature vectors. This ensures a resulting anonymous voice profile feature vector is sufficiently robust for use in later user recognition processing at runtime. Thus, the user profile updater 1045 may be configured to only generate an anonymous voice profile feature vector from a cluster if the cluster has at least a minimum density.

The user profile updater 1045 (or another component of the system(s) 120) may assign a particular anonymous voice profile identifier to a newly created anonymous voice profile feature vector.

If the user profile updater 1045 determines a cluster of user recognition feature vectors (or a user recognition feature vector generated from a cluster of user recognition feature vectors) does not correspond to a user recognition feature vector representing an already established voice profile, the user profile updater 1045 may store the cluster of user recognition feature vectors in storage (not illustrated) for a duration of time, after which the cluster may be deleted from the storage. By storing the cluster, if the system(s) 120 thereafter receives a signal indicating the cluster corresponds to a particular established voice profile, the voice profile updater 1045 may then update the particular established voice profile using the previously stored cluster of user recognition feature vectors. Such a signal may be embodied in various forms, such as a user input explicitly indicating a feature vector of the cluster corresponds to a particular user (and by extension a corresponding voice profile).

A single user of the system(s) 120 may be associated with various voice profiles. A user's speech spoken in the morning may have different speech characteristics that the user's speech spoken in the evening. Thus, for example, a user's identifier may be associated with a first voice profile generated using user recognition feature vectors representing user inputs captured in the morning and a second voice profile generated using user recognition feature vectors representing user inputs captured in the evening.

A user speech captured by a first device may be represented to have different speech characteristics than the same speech captured by a second device. This may, at least partially, be due to the environmental noises present at the first and second devices, the audio capturing capabilities (e.g., microphone qualities) of the first and second devices, etc. As such, for example, a user's identifier may be associated with a first voice profile generated using user recognition feature vectors representing user inputs captured by a first device and a second voice profile generated using user recognition feature vectors representing user inputs captured by a second device.

To update such voice profiles effectively, user recognition feature vectors, represented in the clustered user recognition feature vectors 1040, may be associated with various data, such as time of day, device identifier, etc. The voice profile updater 1045 may user such data to update an applicable voice profile. For example, if a user recognition feature vector is determined to correspond to a morning voice profile and an evening voice profile (which are associated with the same user identifier), and the user recognition feature vector is associated with data indicating the user recognition feature vector represents a user input captured in the morning, the voice profile updater 1045 may use the user recognition feature vector to update the morning voice profile but not the evening voice profile. For further example, if a user recognition feature vector is determined to correspond to a first device voice profile and a second device voice profile (which are associated with the same user identifier), and the user recognition feature vector is associated with data indicating the user recognition feature vector represents a user input captured by the first device, the voice profile updater 1045 may use the user recognition feature vector to update the first device voice profile but not the second device voice profile.

The clustering component 1025 and/or the voice profile updater 1045 may implement a model(s) trained specific to a group profile. Such a model(s) would enable the clustering component 1025 and/or the voice profile updater 1045 to better discriminate for the users associated with the group profile.

When the system(s) 120 receives a user input, the system(s) 120 may be unable to determine (with at least a threshold confidence) that a particular user provided the user input. As described above, the system(s) 120 may perform clustering with respect to the user input to determine which voice profile the user input belongs (if any). In addition to or instead of performing such clustering, the system(s) 120 may be configured to associate a user input with a particular user identifier based on information received after the user input is originally received.

Figure 11:
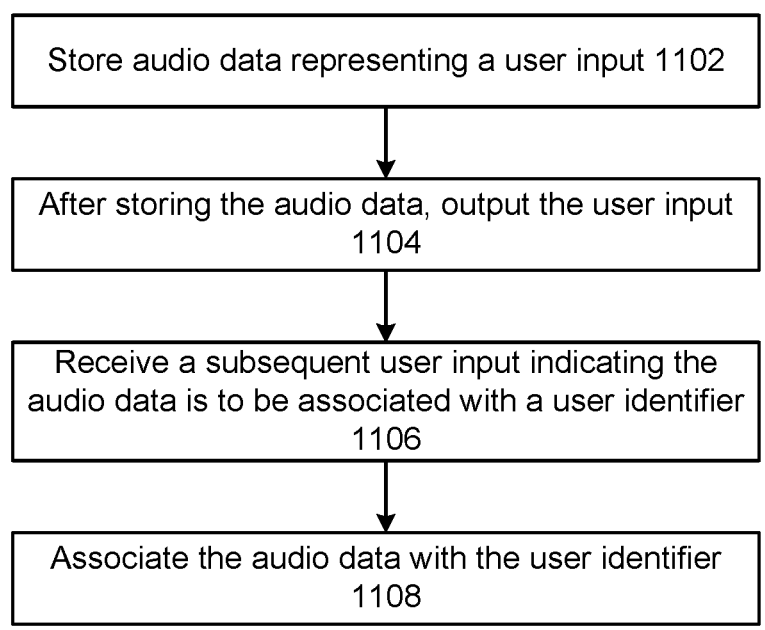
FIG. 11 is a process flow diagram illustrating the labeling of a user input according to embodiments of the present disclosure.

For example, the system(s) 120 may associate a user input with a particular user identifier based on a subsequent user input (as illustrated in FIG. 11). When the system(s) 120 receives audio data representing a user input and is unable to determine (with at least a minimum confidence) that the user input was originated by a particular user, the system(s) 120 may store (1102) the audio data.

After storing the audio data, the system(s) 120 may output (1104) the user input to the same or a different user that originated the user input. For example, a user associated with a group profile may use a companion application to cause the system(s) 120 to output audio representing user inputs with respect to which the system(s) 120 is unsure which user(s) originated the user inputs. A companion application may enable a device 110 to communicate with the system(s) 120. An example companion application is the Amazon Alexa application installed on smart phones, tablets, and the like.

The system(s) 120 may receive (1106) a subsequent user input indicating an output user input is to be associated with a particular user identifier. For example, after the system(s) 120 outputs audio representing a previous user input, the user may provide an indication that a particular user originated the user input. Such indication may correspond to a spoken user input, the selection of a user name presented in a graphical user interface (GUI) list of user names associated with a group profile, etc.

The system(s) 102 may determine a user identifier corresponding to the indicated user, and may associate (1108) the audio data (stored at step 1102) with the user identifier. The processes described with respect to FIG. 11 may be referred to as runtime ground truthing.

Figure 12:
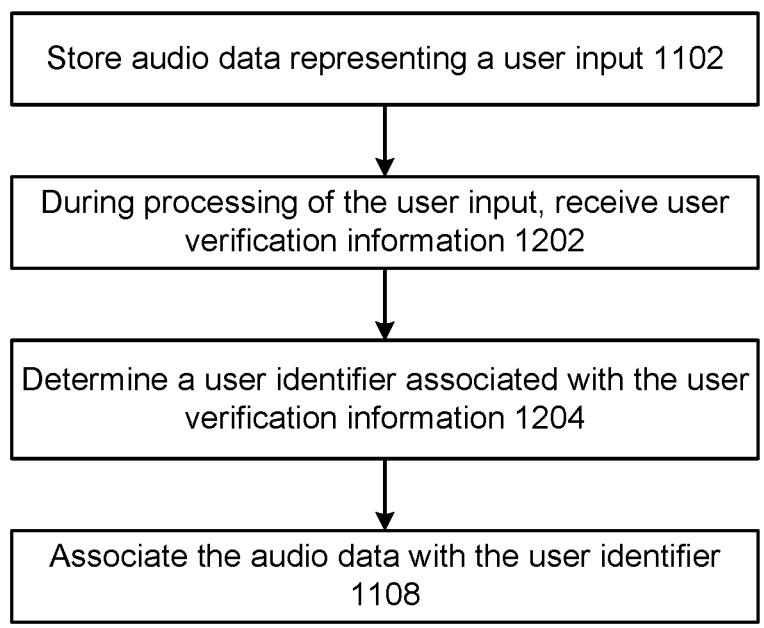
FIG. 12 is a process flow diagram illustrating the labeling of a user input according to embodiments of the present disclosure.

The system(s) 120 may also or alternatively retroactively associate a user input with a particular user based on other information provided by a user in the same user/system dialog as the initial user input (as illustrated in FIG. 12). In this situation, a particular service of or associated with the system(s) 120 may recognize a user and the system(s) 120 may leverage such user recognition to label a previous user input. Thus, the system(s) 120 may use information received with respect to a turn of a dialog to label a user input provided in a previous turn of the same dialog.

When the system(s) 120 receives audio data representing a user input and is unable to determine (with at least a minimum confidence) that a particular user originated the user input, the system(s) 120 may store (1102) the audio data.

During processing of the user input (e.g., in an effort to perform an action responsive to the user input) the system(s) 120 may receive (1202) user verification information. Such user verification information may correspond to user login information associated with a particular service, etc. As an example, the user input may corresponding to a request to purchase an item. In order to authorize the purchase, the system(s) 120 may request a username and password, voice pin code, or some other user identifying information associated with a shopping service.

The system(s) 120 may determine (1204) a user identifier associated with the user verification information. In other words, the system(s) 120 may determine a user identifier representing a user profile including the user verification information. The system(s) 120 may thereafter associate (1108) the audio data (stored at step 1102) with the user identifier.

As described with respect to FIGS. 11 and 12, a user input that initially received a low user recognition confidence may be associated with a particular user identifier based on further user input (whether the same or a different user that originated the initial user input provides the further user input). In some examples, such association may occur based on signals received from a service of the system(s) 120. For example, a user input may request a particular type of music (e.g., classical, jazz, rock, etc.) be output. A music skill (or other music service) of the system(s) 120 may maintain a record of which users of a group profile traditionally ask for what types of music. For example, the music skill may have data representing a first user of a group profile may traditionally ask for jazz music whereas a second user of the group profile may traditionally ask for rock music. While the music skill may not receive a user identifier representing a user that spoke the user input (e.g., due to low user recognition confidence being output by the user recognition component 395, the music skill may receive a group profile identifier associated with the device 110 that captured the user input. The music skill may determine data representing user request trends for users associated with the group profile identifier and, based on the music requested in the present user input, may determine a likely user that originated the user input. The system(s) 120 may thereafter associated the audio data (representing the user input) with a user profile representing the user determined by the music skill.

In some examples, associating audio data, representing a user input, with a particular user identifier may occur based on which device 110 captured the user input as well as the NLU results representing the user input. Such associating may be considered non-temporal because it is based on data substance rather than timing of when the data was received. For example, two different users may provide user inputs to a single device 110. The system(s) 120 may maintain a record of NLU results for user inputs as well as which users provided the user inputs. Thereafter, there may be a situation when a user provides a user inputs to the device 110, but the system(s) 120 (in particular the user recognition component 395) is unable to recognize the user. The system(s) 120 may generate NLU results for the user input. The system(s) 120 may identify usage history data associated with a device identifier representing the device 110 that captured the user input. The system(s) 120 may determine the NLU results representing the present user input are similar or identical to NLU results in the usage history data. The system(s) 120 may determine a user identifier associated with the similar or identical NLU results in the usage history data. Thereafter, the system(s) 120 may associate audio data (representing the present user input) with the user identifier. The system(s) 120 may compare NLU results data on the intent indicator and/or slot representation level.

The user profile updater 1045 may use the audio data retroactively associated with a user identifier to update a voice profile associated with the user identifier. One skilled in the art will appreciate that updating a voice profile using a user input that initially received a low user recognition confidence, but later was associated with a particular user known to the system(s) 120, may provide significant gain to a voice profile. The voice profile updater 1045 may update a voice profile, using a retroactively labeled user input, at runtime or during offline operations.

Configuration of the system components and the models implemented thereby may be adapted based on the number of associations generated based on information received from users through a companion application, based on a distribution of user recognition confidence values, and/or other supervised and unsupervised metrics.

Figure 13:
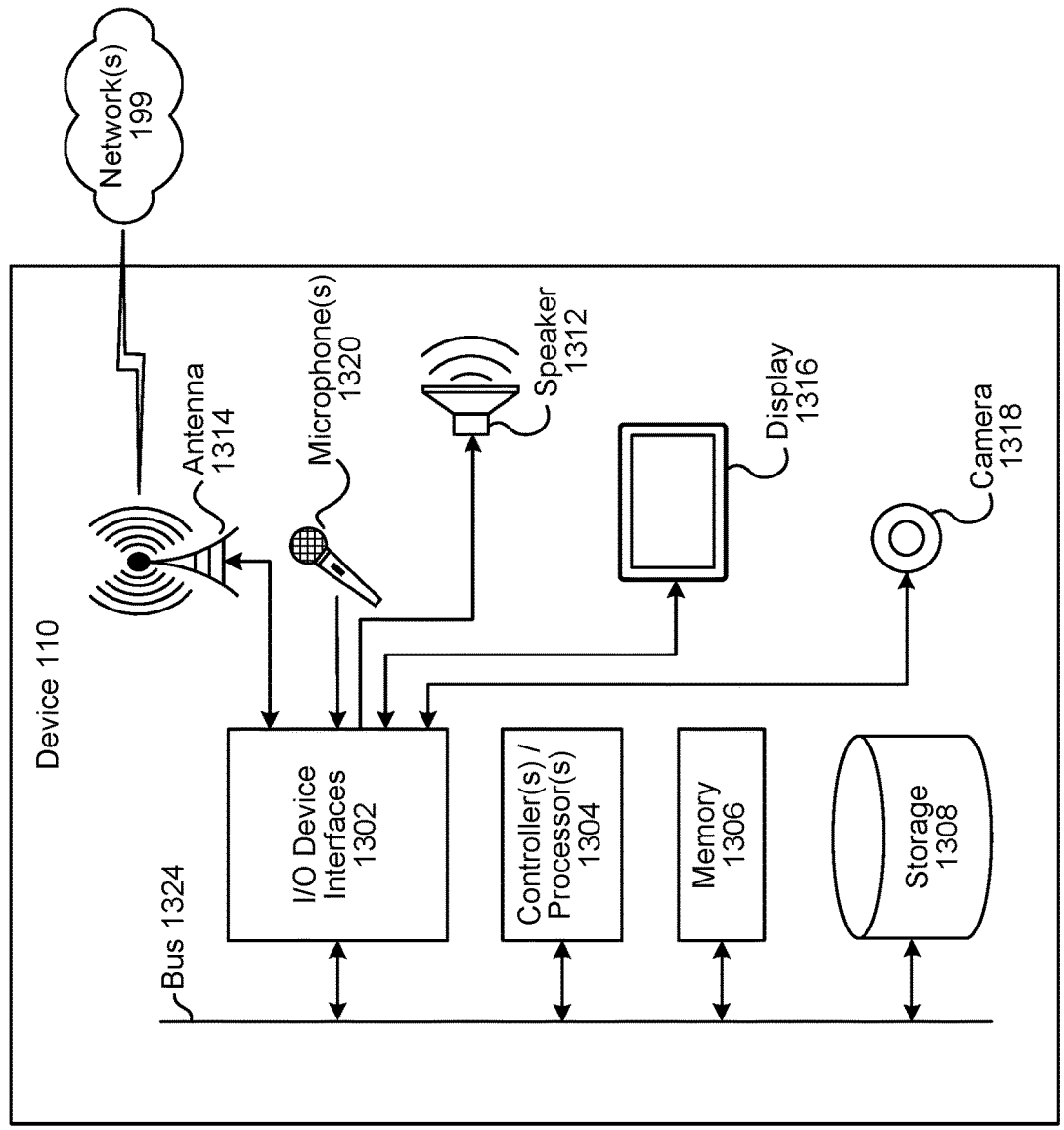
FIG. 13 is a block diagram conceptually illustrating example components of a device according to embodiments of the present disclosure.
Figure 14:
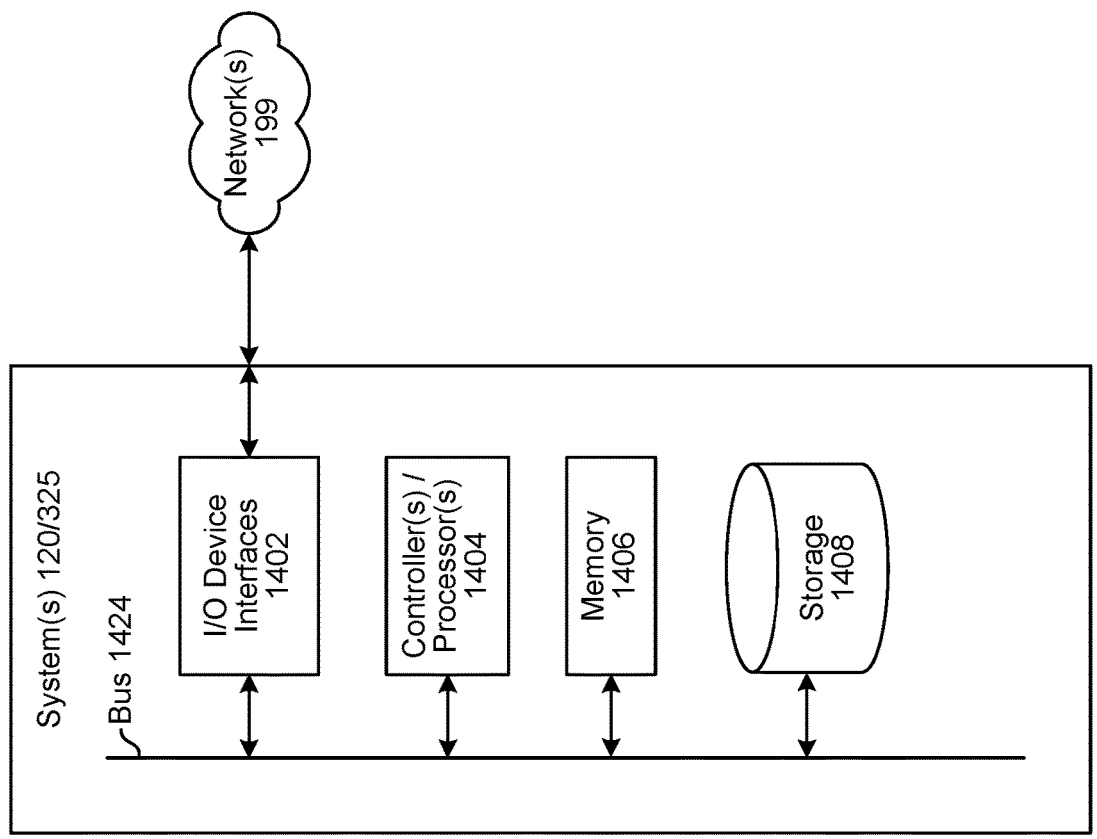
FIG. 14 is a block diagram conceptually illustrating example components of a server according to embodiments of the present disclosure.

FIG. 13 is a block diagram conceptually illustrating a device 110 that may be used with the system. FIG. 14 is a block diagram conceptually illustrating example components of a remote device, such as the system(s) 120, which may assist with ASR processing, NLU processing, etc., and the skill system(s) 325. A system (120/325) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/325) may be included in the overall system of the present disclosure, such as one or more systems 120 for performing ASR processing, one or more systems 120 for performing NLU processing, one or more skill systems 325 for performing actions responsive to user inputs, etc. In operation, each of these systems may include computer-readable and computer-executable instructions that reside on the respective device (120/325), as will be discussed further below.

Each of these devices (110/120/325) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/325) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/325) may also be connected to removable or external non-volatile memory and/or storage (such as a removable memory card, memory key drive, networked storage, etc.) through respective input/output device interfaces (1302/1402).

Computer instructions for operating each device (110/120/325) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/325) includes input/output device interfaces (1302/1402). A variety of components may be connected through the input/output device interfaces (1302/1402), as will be discussed further below. Additionally, each device (110/120/325) may include an address/data bus (1324/1424) for conveying data among components of the respective device. Each component within a device (110/120/325) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 1314, the input/output device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 110, the system(s) 120, or the skill system(s) 325 may include their own dedicated processors, memory, and/or storage. Alternatively, one or more of the components of the device(s) 110, the system(s) 120, or the skill system(s) 325 may utilize the I/O interfaces (1302/1402), processor(s) (1304/1404), memory (1306/1406), and/or storage (1308/1408) of the device(s) 110 system(s) 120, or the skill system(s) 325, respectively. Thus, the ASR component 350 may have its own I/O interface(s), processor(s), memory, and/or storage; the NLU component 360 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 325, as described herein, are illustrative, and may be located as a stand-alone device or may be included, in whole or in part, as a component of a larger device or system.

Figure 15:
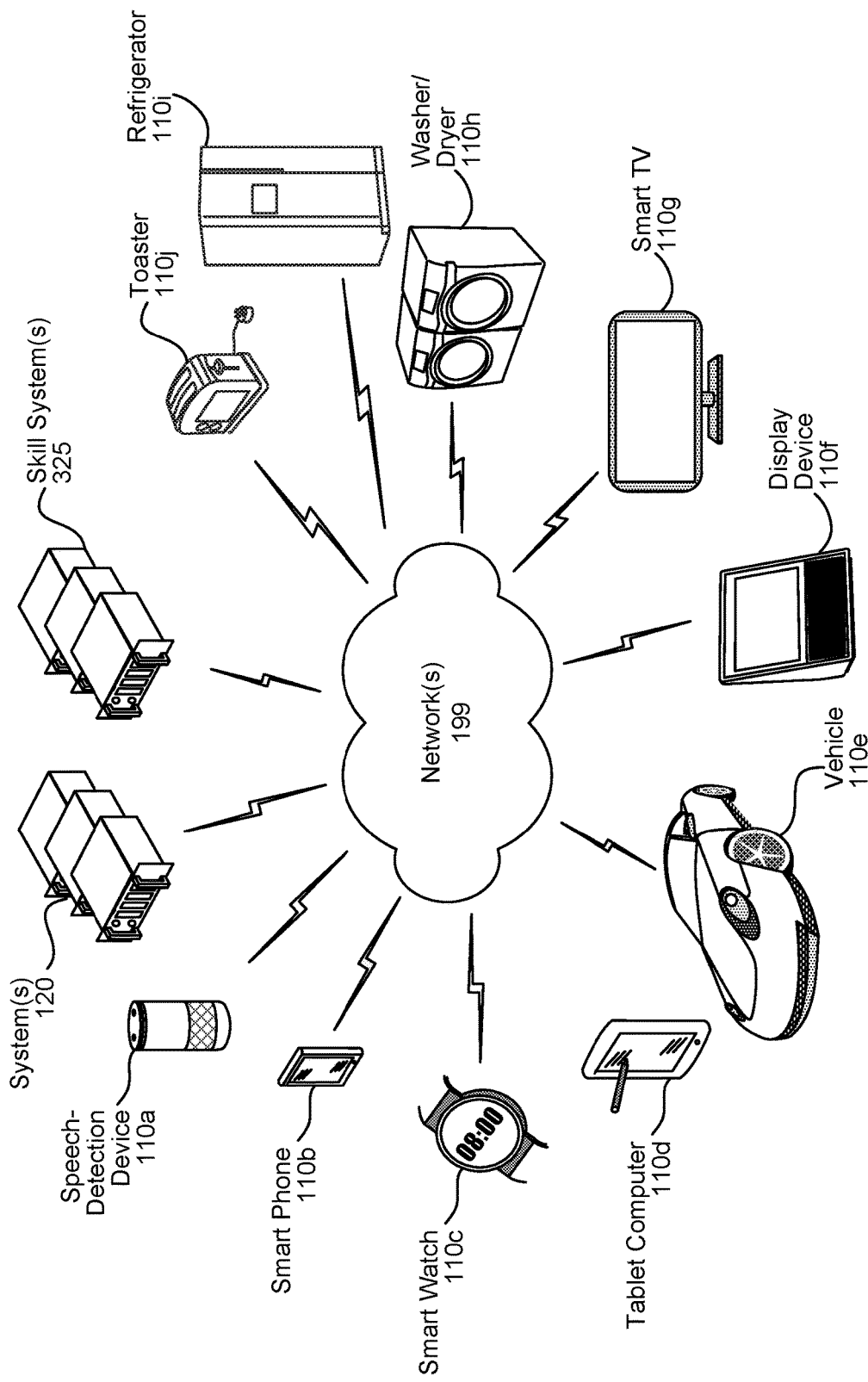
FIG. 15 illustrates an example of a computer network for use with the speech processing system.

As illustrated in FIG. 15, multiple devices (110a-110j, 120, 325) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the skill system(s) 325, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 350, the NLU component 360, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
    generating first voice profile data associated with a group profile identifier and a first user identifier;
    identifying a first stored representation of a first user input received after the first voice profile data is generated, the first stored representation being associated with a group profile identifier and the first user identifier;
    identifying a second stored representation of a second user input received after the first voice profile data is generated, the second stored representation being associated with the group profile identifier and the first user identifier;
    determining the first stored representation is similar to the second stored representation;
    generating updated first voice profile data using the first voice profile data, the first stored representation, and the second stored representation; and
    storing an association between the updated first voice profile data and the first user identifier.

2. The method of claim 1, further comprising:
    determining a first number of stored representations used to generate the first voice profile data;
    determining a second number corresponding to an amount of stored representations, the second number representing the first number, the first stored representation, and the second stored representation; and
    based at least in part on the second number, generating the updated first voice profile data.

3. The method of claim 1, further comprising:
    determining the first stored representation is associated with a first intent indicator;
    determining the second stored representation is associated with a second intent indicator;
    determining the first intent indicator is different from the second intent indicator; and
    based at least in part on determining the first intent indicator is different from the second intent indicator, generating the updated first voice profile data.

4. The method of claim 1, further comprising:
    determining a third stored representation of a third user input;
    determining a fourth stored representation of a fourth user input;
    determining the third stored representation is similar to the fourth stored representation;
    determining the third stored representation and the fourth stored representation are dissimilar to the first voice profile data; and
    based at least in part on determining the third stored representation and the fourth stored representation are dissimilar to the first voice profile data, generating second voice profile data using the third stored representation and the fourth stored representation.

5. The method of claim 1, wherein the first stored representation corresponds to first audio data, the second stored representation corresponds to second audio data, and wherein the method further comprises:
    generating a first user recognition feature vector representing the first audio data;
    generating a second user recognition feature vector representing the second audio data; and
    determining the first user recognition feature vector is similar to the second user recognition feature vector.

6. The method of claim 1, wherein the first stored representation is a first user recognition feature vector, the second stored representation is a second user recognition feature vector, and the method further comprises:
    determining a distance between the first user recognition feature vector and the second user recognition feature vector; and
    based at least in part on the distance, determining the first user recognition feature vector is similar to the second user recognition feature vector.

7. A method, comprising:
    generating first voice profile data associated with a first user identifier;
    identifying a first stored representation of a first user input received after the first voice profile data is generated, the first stored representation being associated with the first user identifier;
    identifying a second stored representation of a second user input received after the first voice profile data is generated, the second stored representation being associated with the first user identifier;
    determining the first stored representation is similar to the second stored representation;
    generating updated first voice profile data using the first voice profile data, the first stored representation, and the second stored representation; and
    storing an association between the updated first voice profile data and the first user identifier.

8. The method of claim 7, wherein the first stored representation corresponds to first audio data, the second stored representation corresponds to second audio data, and wherein the method further comprises:

generating a first user recognition feature vector representing the first audio data;
generating a second user recognition feature vector representing the second audio data; and
determining the first user recognition feature vector is similar to the second user recognition feature vector.

9. The method of claim 7, further comprising:
determining a first number of stored representations used to generate the first voice profile data;
determining a second number corresponding to an amount of stored representations, the second number representing the first number, the first stored representation, and the second stored representation; and
based at least in part on the second number, generating the updated first voice profile data.

10. The method of claim 7, further comprising:
determining the first stored representation is associated with an intent indicator; and
based at least in part on the first stored representation being associated with the intent indicator, generating the updated first voice profile data.

11. The method of claim 7, further comprising:
identifying a third stored representation of a third user input;
determining the third stored representation is dissimilar to the first voice profile data; and
generating second voice profile data using the third stored representation.

12. The method of claim 7, further comprising:
identifying the first stored representation based at least in part on the first stored representation being associated with a group profile identifier.

13. The method of claim 7, wherein the first stored representation is a first user recognition feature vector, wherein the second stored representation is a second user recognition feature vector, and wherein the method further comprises:
determining a distance between the first user recognition feature vector and the second user recognition feature vector; and
based at least in part on the distance, determining the first user recognition feature vector is similar to the second user recognition feature vector.

14. The method of claim 7, further comprising:
receiving audio data representing a third user input;
storing the audio data;
after storing the audio data, receiving an indicator representing the audio data is to be associated with a second user identifier;
identifying second voice profile data associated with the second user identifier; and
using the audio data, generating updated second voice profile data.

15. The method of claim 7, further comprising:
receiving first audio data representing a third user input;
determining the first audio data corresponds to second voice profile data associated with a second user identifier;
determining user profile data, associated with the second user identifier, corresponds to a user name;
generating second audio data including the user name;
causing a first device to output audio corresponding to the second audio data;
receiving, from the first device, third audio data representing the user name is incorrect; and
based at least in part on the third audio data representing the user name is incorrect, using the first audio data as a negative utterance with respect to the second voice profile data.

16. A system, comprising:
at least one processor; and
at least one memory comprising instructions that, when executed by the at least one processor, cause the system to:
generate first voice profile data associated with a first user identifier;
identify a first stored representation of a first user input received after the first voice profile data is generated, the first stored representation being associated with the first user identifier;
identify a second stored representation of a second user input received after the first voice profile data is generated, the second stored representation being associated with the first user identifier;
determine the first stored representation is similar to the second stored representation;
generate updated first voice profile data using the first voice profile data, the first stored representation, and the second stored representation; and
store an association between the updated first voice profile data and the first user identifier.

17. The system of claim 16, wherein the first stored representation corresponds to first audio data, the second stored representation corresponds to second audio data, and wherein the at least one memory further comprises instructions that, when executed by the at least one processor, further cause the system to:
generate a first user recognition feature vector representing the first audio data;
generate a second user recognition feature vector representing the second audio data; and
determine the first user recognition feature vector is similar to the second user recognition feature vector.

18. The system of claim 16, wherein the at least one memory further comprises instructions that, when executed by the at least one processor, further cause the system to:
determine a first number of stored representations used to generate the first voice profile data;
determine a second number corresponding to an amount of stored representations, the second number representing the first number, the first stored representation, and the second stored representation; and
based at least in part on the second number, generate the updated first voice profile data.

19. The system of claim 16, wherein the at least one memory further comprises instructions that, when executed by the at least one processor, further cause the system to:
determine the first stored representation is associated with an intent indicator; and
based at least in part on the first stored representation being associated with the intent indicator, generate the updated first voice profile data.

20. The system of claim 16, wherein the at least one memory further comprises instructions that, when executed by the at least one processor, further cause the system to:
identify a third stored representation of a third user input;
determine the third stored representation is dissimilar to the first voice profile data; and
generate second voice profile data using the second stored representation.

* * * * *